United States Patent
Vrla et al.

(10) Patent No.: US 7,652,390 B2
(45) Date of Patent: Jan. 26, 2010

(54) NETWORK INTERFACE DEVICE COMMUNICATION VIA POWER LINE

(75) Inventors: Clifford Vrla, Minnetonka, MN (US); Mark Thomas Paulsen, Excelsior, MN (US); Mark Richard Biegert, Maple Grove, MN (US); Gary Lee Steinkogler, Eagan, MN (US)

(73) Assignee: Calix Networks, Inc., Petaluma, CA (US)

( * ) Notice: Subject to any disclaimer, the term of this patent is extended or adjusted under 35 U.S.C. 154(b) by 397 days.

(21) Appl. No.: 11/313,222

(22) Filed: Dec. 20, 2005

(65) Prior Publication Data

US 2006/0192434 A1 Aug. 31, 2006

Related U.S. Application Data

(60) Provisional application No. 60/639,860, filed on Dec. 28, 2004.

(51) Int. Cl.
*H04B 3/54* (2006.01)
*H04B 10/00* (2006.01)
*H04J 14/00* (2006.01)

(52) U.S. Cl. .............. 307/1; 307/3; 307/4; 398/66; 398/67; 398/71; 398/72; 398/171

(58) Field of Classification Search .............. 307/1, 307/3, 4; 398/66, 67, 38, 71, 72, 171
See application file for complete search history.

(56) References Cited

U.S. PATENT DOCUMENTS

| | | | |
|---|---|---|---|
| 5,381,554 A * | 1/1995 | Langer et al. .................. 714/14 |
| 6,577,230 B1 | 6/2003 | Wendt et al. | |
| 7,082,541 B2 * | 7/2006 | Hammond et al. .......... 713/300 |
| 7,194,639 B2 | 3/2007 | Atkinson et al. | |
| 7,330,656 B2 * | 2/2008 | Lee et al. ...................... 398/78 |
| 7,359,647 B1 * | 4/2008 | Faria et al. ................... 398/171 |
| 2003/0033548 A1 * | 2/2003 | Kuiawa et al. .............. 713/300 |
| 2004/0165889 A1 | 8/2004 | Mahony et al. | |
| 2005/0029476 A1 * | 2/2005 | Biester et al. .................. 251/58 |

(Continued)

OTHER PUBLICATIONS

Notification of Transmittal of the International Preliminary Report on Patentability for corresponding patent application No. PCT/US2005/046158; mailed Mar. 8, 2007, 6 pages.

(Continued)

*Primary Examiner*—Albert W Paladini
*Assistant Examiner*—Hal I Kaplan
(74) *Attorney, Agent, or Firm*—Shumaker & Sieffert P.A.

(57) ABSTRACT

The invention is directed to an optical network terminal (ONT) for use in a passive optical network (PON) that provides reliable battery status reporting and, optionally, remote monitoring and configuration of an uninterruptible power supply (UPS) unit. In particular, the UPS unit provides power to the ONT via a power line and transmits data to the ONT via the power line. Generally, the described invention supports one-way or two-way communication of status, alarm, and configuration signals using a single power line. Specifically, such signals may be transmitted over the power line by inserting a carrier frequency, such as a carrier frequency of approximately 1 MHz, onto the power line. In this manner, the invention may provide a simple battery status monitoring system while also reducing the cost of installation.

62 Claims, 10 Drawing Sheets

U.S. PATENT DOCUMENTS

2005/0071699 A1* 3/2005 Hammond et al. .......... 713/300
2005/0144616 A1* 6/2005 Hammond et al. .......... 717/173
2006/0034449 A1* 2/2006 Joerger ...................... 379/413
2006/0082220 A1* 4/2006 Karam et al. ................. 307/4

OTHER PUBLICATIONS

The Reply to Written Opinion for corresponding patent application No. PCT/US2005/046158, dated Oct. 12, 2006, 7 pages.

"IP Cablecom Embedded MTA Primary Line Support," Society of Cable Telecommunications Engineers, ANSI/SCTE 24-14 2002, (24 pages).

"IP Cablecom Embedded MTA Primary Line Support," Series J: Cable Networks and Transmission of Television, Sound PRogramme and Other Multimedia Signals, ITU-T J.173, Feb. 2002, (24 pages).

Jugan et al., "Powering Architectures For New Needs In Telecommunications," Telecommunications Energy Conference, Intelec 95, pp. 196-202.

D. Kuhn et al., "Powering Issues In An Optical Fibre Customer Access Network", Proceedings of the International Telecommunications Energy Conference, 1991, pp. 51-58.

W. Schulz, "Powering FITL for Deutsche Telekom," Telecommunications Energy Conference, 1998, pp. 255-260.

Notification of Transmittal of the International Search Report and the Written Opinion of the International Searching Authority for corresponding patent application No. PCT/US2005/046158, mailed Jun. 7, 2006, 12 pages.

\* cited by examiner

NETWORK INTERFACE DEVICE COMMUNICATION VIA POWER LINE

This application claims the benefit of U.S. provisional application No. 60/639,860, filed Dec. 28, 2004, the entire content of which is incorporated herein by reference.

TECHNICAL FIELD

The invention relates to networking and, more particularly, communication with a network interface device power supply.

BACKGROUND

A network interface device permits a subscriber to access a network. A passive optical network (PON) is an example of a network capable of delivering voice, video and other data among multiple network subscribers, using a common optical fiber link. Passive optical splitters and combiners enable multiple optical network terminals (ONTs) to share the optical fiber link. In a PON, each ONT terminates the optical fiber link for a residential or business subscriber, and is sometimes referred to as a subscriber premises node that delivers Fiber to the Premises (FTTP) services.

An ONT is connected to one or more subscriber devices, such as televisions, set-top boxes, telephones, computers, or network appliances, which ultimately receive the voice, video and data delivered via the PON. An ONT is an example of a network interface device. Other examples of a network interface device, in different network types, include cable modems and digital subscriber line (DSL) boxes.

Generally, a network also includes a network access interface. In a PON, the network access interface is sometimes referred to as an optical line terminator (OLT), having multiple, independent PON interface modules that serve multiple optical fiber links. A PON interface module provides an interface for transmission and reception of data packets over a particular optical fiber link that serves a group of ONTs. A PON is a downstream-multicast medium. Each packet transmitted on an optical fiber link can be received by every ONT served by that link. ONTs identify selected packets or frames on the fiber link based on addressing information included within the packets or frames.

Network equipment, such as network interface devices, in a cable or hybrid network may be connected to power provided by a central office (CO), which commonly utilizes battery and generator back-up power to maintain a continuous power supply. In contrast, an ONT in an all-fiber optic network is ordinarily powered locally at the subscriber premises. For this reason, an ONT often includes a battery to provide back up power during a power outage to maintain critical services, such as voice service. In particular, many FTTP service providers provide an uninterruptible power source (UPS) unit. A UPS unit provides AC-to-DC (alternating current to direct current) voltage conversion from line power within the subscriber premises, and includes a battery for backup power.

Battery resources are limited and depend on battery size and the rate of power consumption. Because battery performance and reliability are adversely affected by temperature extremes, a UPS unit is normally mounted inside the subscriber's premises. It is important that the battery-based power source be reliable in order to maintain critical services during a power outage. Because batteries are chemical systems that wear out over time, however, batteries must be replaced and are generally unreliable.

A UPS unit typically performs battery status monitoring functions on a continuous or periodic basis to ensure the health of the battery and the reliability of the FTTP network. A UPS unit may transmit battery status or alarm signals, such as AC Fail, Battery Low, Replace Battery, and Battery Missing, as discrete signals on separate wires to a network interface device, such an ONT. As a result, a UPS unit may have at least six wires: power, ground, and a wire dedicated to each status or alarm signal.

SUMMARY

In general, the invention is directed to techniques for reliable power supply status notification or monitoring and, optionally, remote monitoring and configuration of a power supply via a power line. The techniques may be used to monitor the status of an uninterruptible power supply (UPS) unit used to provide power to a network interface device.

For example, a UPS unit may provide power to a network interface device, such as an ONT in a PON. The UPS unit provides power via a power line and transmits status or alarm signals to the network interface device via the same power line. In some embodiments, the UPS unit may receive status request signals or configuration signals from the network interface device. Although the invention may be generally applicable to network interface devices in a variety of networks, application of the invention to an ONT in a PON will be described throughout this disclosure for purposes of illustration.

In one embodiment, the invention provides a method comprising supplying power to a network interface device via a power line that extends between the network interface device and an uninterruptible power supply (UPS) unit, and transmitting data to the network interface device from the UPS unit via the power line.

In another embodiment, the invention provides a network interface device comprising circuitry that receives operating power from a power line that extends between the network interface device and an uninterruptible power supply (UPS) unit, and an interface that receives data from the UPS unit via the power line.

In an additional embodiment, the invention provides an uninterruptible power supply (UPS) unit for a network interface device, the UPS unit comprising a power source, a power line that delivers power from the power source to the network interface device, and an interface that transmits data to the network interface device via the power line.

In a further embodiment, the invention provides a network comprising a network interface device, an uninterruptible power supply (UPS) unit, and a power line that delivers power from the UPS unit to the network interface device, wherein the UPS unit transmits data to the network interface device via the power line.

In another embodiment, the invention provides an uninterruptible power supply unit comprising a power source, a plurality of output terminals, wherein the output terminals include a plurality of alarm signal terminals, an adapter unit that couples to the alarm signal terminals, generates data based on signals at the alarm signal terminals, and transmits the data via a power line with power provided by the power source.

In an additional embodiment, the invention provides an adapter unit for an uninterruptible power supply (UPS) unit, wherein the UPS unit includes a power terminal and a plurality of alarm signal terminals, the adapter unit comprising input terminals that couple to the power terminal and the alarm signal terminals, circuitry that generates data based on signals at the alarm signal terminals, and output terminals that couple to a power line to transmit the data via a power line with power provided by the power terminal.

The invention may offer one or more advantages. Unlike UPS units that transmit status and alarm signals on separate wires to the ONT, the invention transmits such signals to the network interface device via a common power line. By eliminating the use of a separate wire for each alarm signal, the invention decreases cost as well as installation complexity and time, and provides a simplified monitoring interface.

For example, adding wires to a UPS cable increases the cost of the cable. In addition, it is difficult to pre-terminate the cable with a connector because different subscriber premises may require different lengths of cable. For reduced cost, neither end of the cable should be pre-terminated with a connector. In this case, the installer is required to terminate the individual wires manually, which is a slow and error-prone operation, particularly with six separate wires in the case of a conventional UPS unit. Thus, transmitting battery alarms as well as status or configuration information via a common power line can reduce the materials and labor cost associated with an FTTP system.

In addition, in some embodiments, the invention may enable two-way communication between an ONT and a UPS unit. Unlike UPS units that allow communication in only one direction, i.e., from the UPS unit to the ONT, in some embodiments, the invention may allow two-way communication between the UPS unit and the ONT. Specifically, it may be desirable to transmit data from the ONT to the UPS unit.

For example, UPS units may have internal software that occasionally requires maintenance, e.g., by downloading a software update. The invention enables the ONT to receive the software update via the PON and transmit the software update to the UPS unit rather than requiring physical access to the UPS units in the subscriber premises, which generally would be expensive and labor-intensive.

Further, software can be used to present a number of different configuration choices to the service provider. For example, a service provider may desire audible alarms with the UPS unit hardware. In some embodiments, the invention may enable audible alarms to be provisioned from a central office (CO) to the UPS unit rather than using a hardware switch at the time of installation of the UPS unit to support an audible alarm.

Consequently, the UPS unit can be remotely configured to support audible alarms. Similarly, if a service provider does not want audible alarms, this feature can be turned off remotely without the need for a service call. By allowing two-way communication over the power line, the invention may provide a cost efficient ONT having additional functionality over ONTs capable of only receiving information from a UPS unit via several discrete wires.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
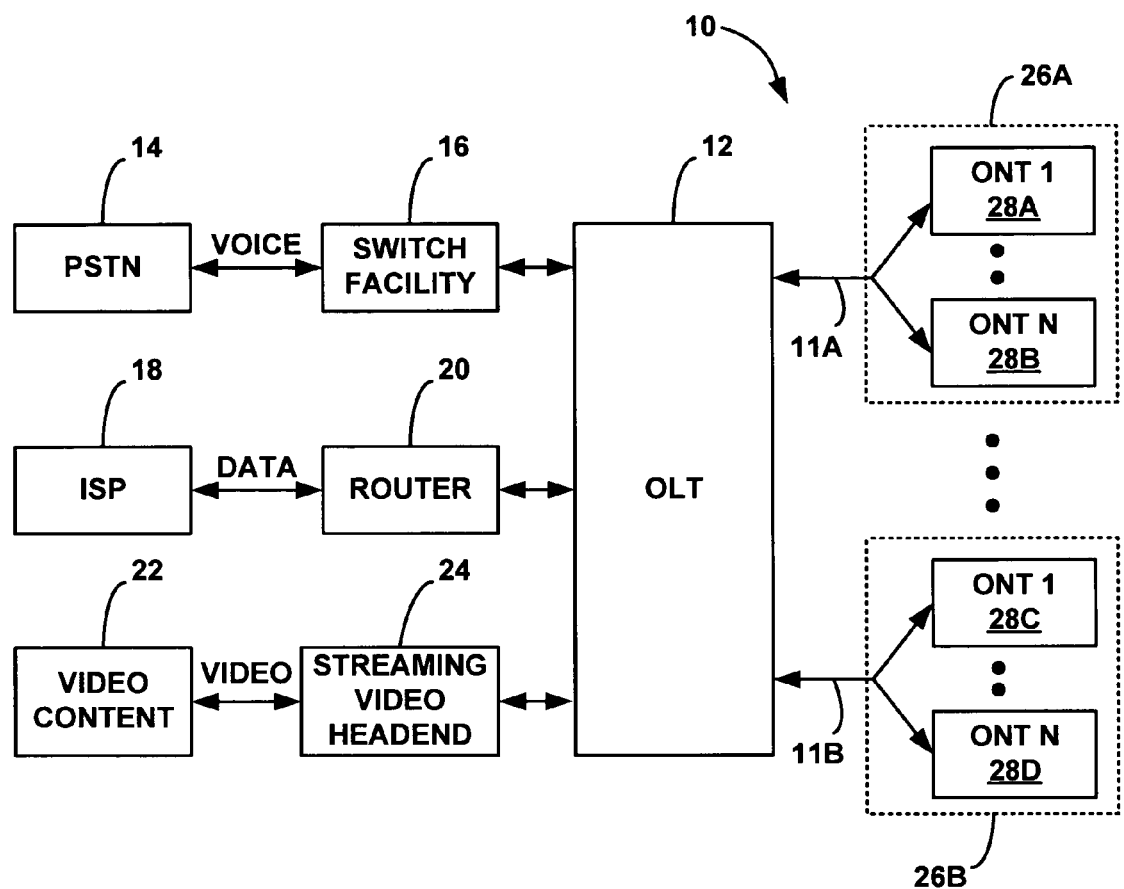
FIG. 1 is a block diagram illustrating an exemplary PON suitable for UPS status monitoring in accordance with the invention.

In general, the invention is directed to techniques for reliable power supply status monitoring and, optionally, remote monitoring and configuration of a power supply via a power line. The techniques may be used to monitor the status of an uninterruptible power supply (UPS) unit used to provide power to a network interface device.

For example, a UPS unit may provide power to a network interface device, such as an ONT in a PON. The UPS unit provides power via a power line and transmits status or alarm signals to the network interface device via the same power line. In some embodiments, the UPS unit may receive status request signals or configuration signals from the network interface device. Although the invention may be generally applicable to network interface devices in a variety of networks, application of the invention to an ONT in a PON will be described throughout this disclosure for purposes of illustration.

As described herein, one-way or two-way communication of status, alarm, and configuration signals can be achieved using a common power line. The signals may be transmitted over a direct current (DC) power line extending between a UPS unit and an ONT using a modulated carrier signal that is inserted on the power line. For example, a carrier signal may be inserted onto the power line when data is to be transmitted between the UPS unit and the ONT. Presence of the carrier signal on the power line is used to present data. For example, presence of the carrier signal may indicate a logic low state.

In-line filters may be provided at both ends of the power line to filter the carrier frequency out of the power signal received at the power supply terminals of the UPS unit or the ONT. A physical interface converts incoming and outgoing half duplex digital data into a signal that is AC coupled onto the power line. In some embodiments, the invention may utilize a single wire interface or RS232 protocol to transmit data via the power line.

In one example, the UPS unit may transmit data, such as a status signal or alarm signal, to the ONT circuitry via the power line in response to detecting a change in the status of the battery or receiving a status request from the ONT. The status or alarm signal may include AC Fail, Battery Low, Replace Battery, or Battery Missing, as well as other status or alarm signals. Thus, the invention does not require a dedicated wire for each status or alarm signal, simplifying the interface between the UPS unit and the ONT circuitry.

In another example, the ONT may transmit a status request to the UPS unit. The ONT may receive the status request from a central office (CO) on the PON. Periodic status requests may be required by the CO to ensure reliability of the PON. The UPS unit may transmit a status/alarm signal or acknowledgement signal to the ONT circuitry in response to receiving the status request. In this manner, in some embodiments, the invention may provide simple battery status monitoring by enabling two-way communication over a single power line.

In a further example, the ONT may transmit a configuration command to the UPS unit. The configuration command may also be received from a CO on the PON, or generated by a technician. The UPS unit can be remotely configured to support different configurations, such as the availability of audible alarms. Similarly, if a service provider does not want audible alarms, this feature can be turned off remotely without the need for a service call. Furthermore, the configuration command provided to the UPS unit may include software updates.

FIG. 1 is a block diagram illustrating a passive optical network (PON) 10. Although application of the invention to an ONT in a PON 10 is described herein for purposes of illustration, the invention is not so limited, and may be applicable to network interface devices in other types of networks. As shown in FIG. 1, PON 10 can be arranged to deliver voice, data and video content (generally "information") to a number network nodes via optical fiber links. Exemplary components for implementing a PON are commercially available from Optical Solutions, Inc., of Minneapolis, Minn., and designated by the tradename Fiberpath™, including the Fiberdrive™ headend bay interface, i.e., optical line terminal (OLT), and the Fiberpoint™ subscriber premise node, i.e., optical network terminal (ONT). The OLT and ONT may conform to any of a variety of PON standards, such as the broadband PON (BPON) standard (ITU G.983) or the gigabit-capable PON (GPON) standard (ITU G.984), as well as future PON standards under development by the Full Service Access Network (FSAN) Group or other organizations.

An OLT 12 may receive voice information, for example, from the public switched telephone network (PSTN) 14 via a switch facility 16. In addition, OLT 12 may be coupled to one or more Internet service providers (ISP's) 18 via the Internet and a router 20. As further shown in FIG. 1, OLT 12 may receive video content 22 from video content suppliers via a streaming video headend 24. Video also may be provide as packet video over the Internet. In each case, OLT 12 receives the information, and distributes it along optical fiber links 11A and 11B (collectively "fiber links 11") to groups 26A and 26B (collectively "groups 26") of ONTs 28A, 28B, 28C and 28D (collectively "ONTs 28"). Each of groups 26 is coupled to a respective one of optical fiber links 11. OLT 12 may be coupled to any number of fiber links 11. For purposes of illustration, FIG. 1 shows only two fiber links 11A, 11B.

ONTs 28 include hardware for receiving information from PON 10 via optical fiber links 11, and delivering the information to a connected subscriber device (not shown), or one or more connected devices. For example, each ONT 28 may serve as a PON access point for one or more computers, network appliances, televisions, set-top boxes, wireless devices, or the like, for video and data services. In addition, each ONT 28 may be connected to subscriber telephones for delivery of telephone services. Hence, ONT 28 may provide information in the form of video to support television applications, data to support Internet access, and voice to support telephone services. OLT 12 may be located near or far from a group 26 of ONTs 28. However, OLT 12 is typically located in a telecommunication company central office (CO), while ONTs 28 may be located at any of a variety of locations, including residential or business premises.

In addition, a single ONT 28 may operate on a shared basis to deliver information to two or more closely located residential or business premises via copper or additional optical fiber connections, either directly or via a network hub, router or switch. A group 26 of ONTs 28 may refer to nodes served by OLT 12 via a common optical fiber link 11. Each group 26 in FIG. 1 contains two ONTs 28 for purposes of illustration. However, a group 26 may include a single ONT 28, or numerous ONTs.

ONT 28 also may include hardware for transmitting information over PON 10. For example, an ONT 28 may transmit voice information over PSTN 14 via OLT 12 and switch facility 16 in the course of a telephone conversation. In addition, an ONT 28 may transmit data to a variety of nodes on the Internet via ISP 18, router 20 and OLT 12. Multiple ONTs 28 typically transmit upstream over a common optical fiber link 11 using time division multiplexing techniques, and rely on a downstream grant packet for assignment of upstream time slots to individual ONTs.

ONT 28 is an example of a network interface device. As will be described in detail, each of ONTs 28 is coupled to an uninterruptible power supply (UPS) unit (not shown) that provides power and transmits data to ONTs 28 via a power line. A UPS unit provides AC-to-DC voltage conversion from line power within the subscriber's premises and includes a battery for backup power to maintain critical services such as voice communication during a power failure. However, because battery power is generally unreliable, it is desirable to perform battery monitoring functions to ensure the health of the battery and the reliability of ONT 26 and PON 10.

OLT 12 communicates with ONT 28 via optical fiber link 11 and may include a configuration module and a monitoring module. Generally, the monitoring module remotely monitors the status of the battery within the UPS unit at periodic intervals and the configuration module provides software maintenance for the UPS unit. In this manner, OLT 12 provides reliable battery status monitoring and configuration of the UPS unit by exchanging data with ONTs 28.

ONT 28 is configured so that battery status monitoring and configuration data is exchanged between the UPS unit and the ONT circuitry via a common signal line, which also serves as the power line between the UPS unit and the ONT circuitry. By transmitting status, alarm, or configuration signals between the UPS unit and ONT circuitry via a common power line, the invention may provide a low cost, low complexity FTTP system with advanced battery status monitoring and configuration features.

Figure 2:
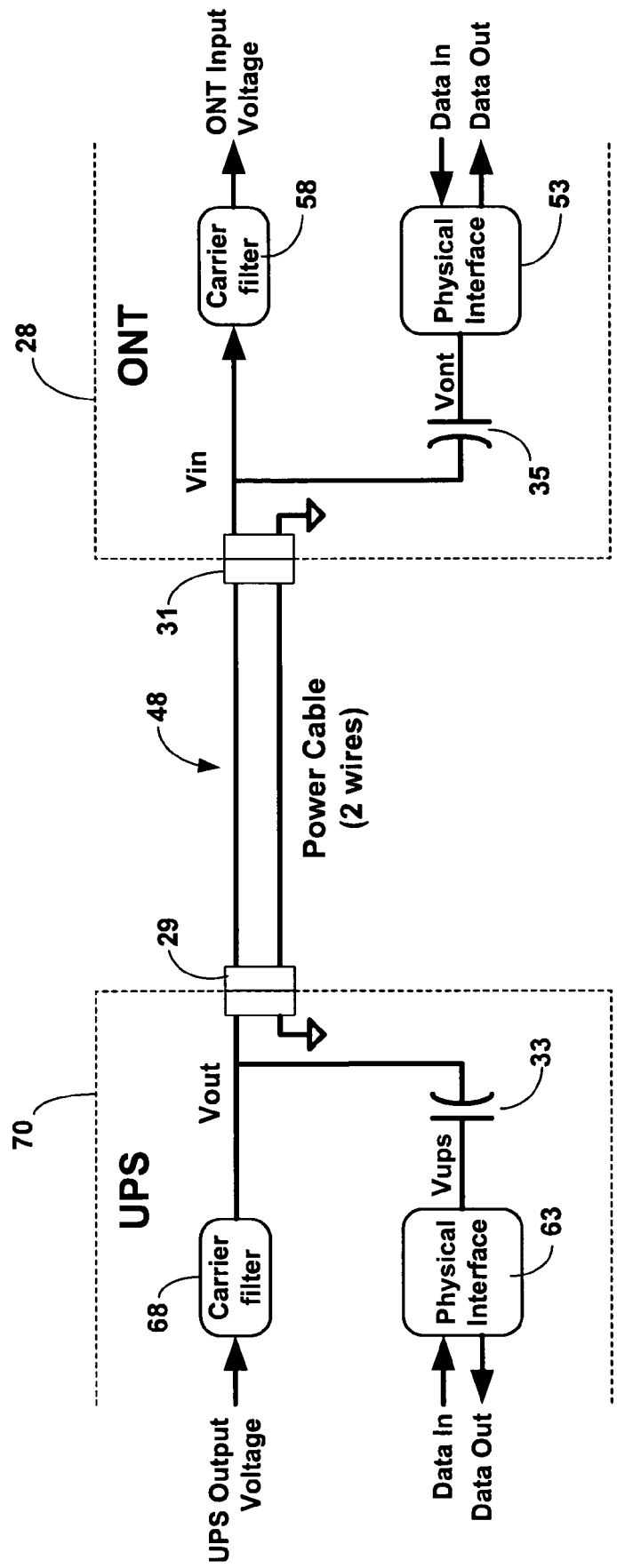
FIG. 2 is a block diagram illustrating a UPS unit that provides power and data to an ONT via a common power line.

FIG. 2 is a block diagram illustrating an uninterruptible power supply (UPS) unit 70 that provides power and data to an ONT 28 via a common power line 48, which includes two wires (power and ground) and is coupled to terminals 29, 31. FIG. 2 represents the physical layer communication between ONT 28 and UPS unit 70. As shown in FIG. 2, UPS unit 70 includes an AC coupling capacitor 33, a physical interface 63, and a carrier filter 68. ONT 28 includes an AC coupling capacitor 35, a physical interface 53, and a carrier filter 58. The arrangement shown in FIG. 2 may be configured for simplex communication from the UPS unit 70 to ONT 28, or for half-duplex or full-duplex communication between UPS unit 70 and ONT 28.

The transmit side of UPS physical interface 63 receives a serial logic input, Data In, from UPS processing circuitry, and modulates a carrier signal, e.g., approximately 1 to 2 MHz, so that the carrier is present on power line 48 when Data In at UPS unit 70 is a logic low. Data In may be modulated by UPS processing circuitry to indicate data representative of status or alarm signals. Accordingly, the UPS processing circitry may include or communicate with status monitoring circuitry within UPS unit 70. Conversely, the receiver portion of ONT physical interface 53 detects this modulation on power line 48 and converts it to logic low at the Data Out of ONT 28. For duplex communication, physical interface 53 of ONT 28 similarly may modulate a carrier on power line 48 in response to Data In at the ONT 28. In this case, physical interface 63 of UPS unit 70 detects the carrier on the power conductor of power line 48 and converts it to logic low at Data Out of UPS unit 70.

Figure 4:
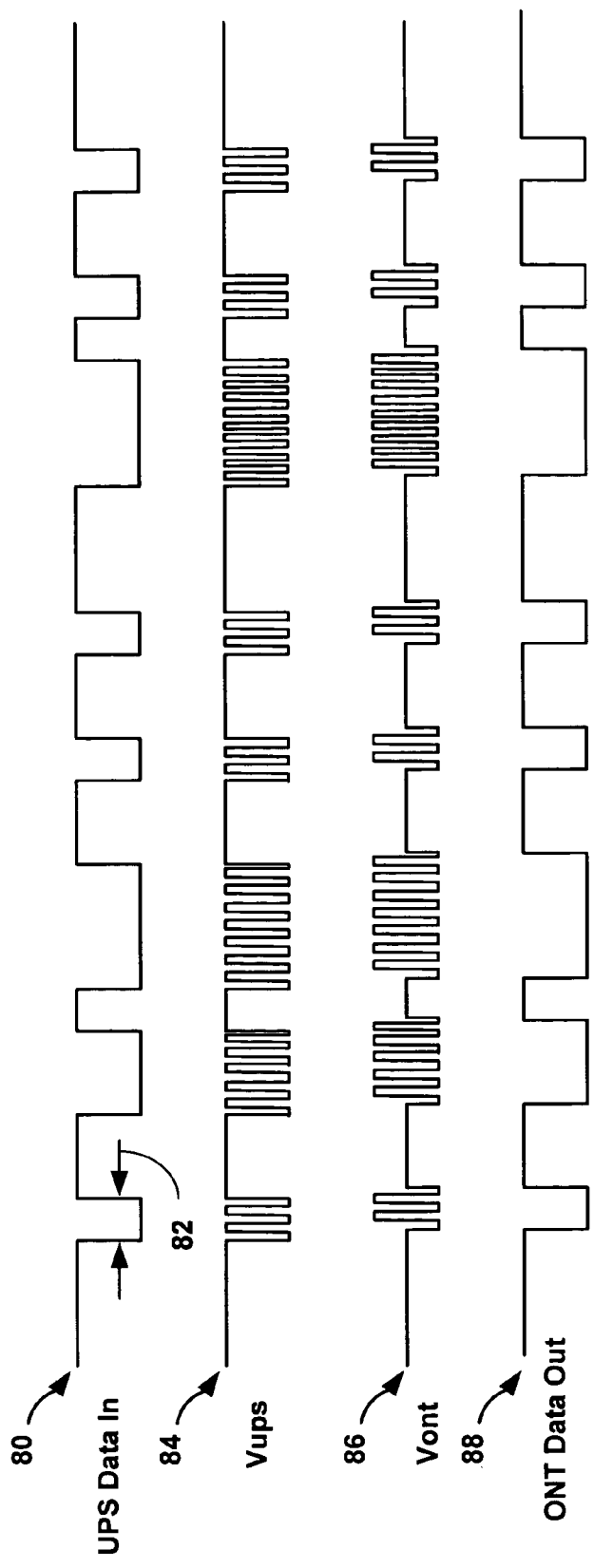
FIG. 4 illustrates example physical layer waveforms generated by the ONT and UPS unit for transmitting serialized data over the common power line.

To minimize electromagnetic interference (EMI), Data In normally may be held at logic high, which means that no modulation is normally coming out of physical interface 63 or physical interface 53. Typical physical layer waveforms for communication are shown in FIG. 4, which will be described in greater detail below. The modulated signal, Vups, produced by physical interface 63 is AC coupled to the Vout line of UPS unit 70 via AC coupling capacitor 33 so that physical interface 63 does not receive the DC Vout voltage. Similarly, the modulated signal, Vont, produced by physical interface 53 is AC coupled to the Vin line of ONT 28 via AC coupling capacitor 35 to remove the DC component of the signal prior to application to physical interface 53. In addition, carrier filters 58, 68 may be provided at each end of power line 48 to keep the output impedance of the UPS unit 70 and the input impedance of the ONT 28 from loading down Vups.

Figure 3:
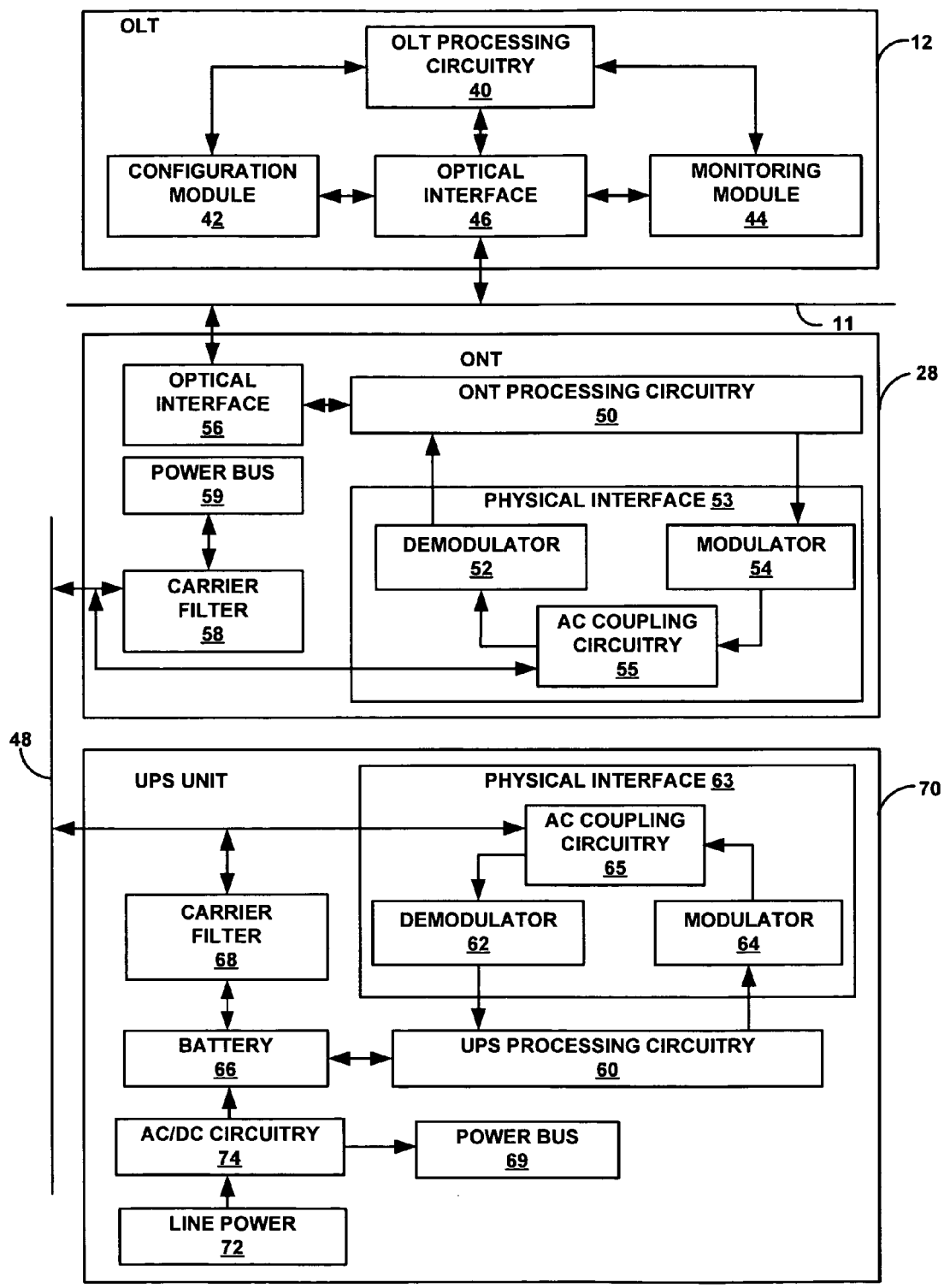
FIG. 3 is a block diagram illustrating incorporation of a UPS unit that provides power and data to the ONT via a common power line in the PON of FIG. 1.

FIG. 3 is a block diagram illustrating an exemplary ONT 28 with an uninterruptible power supply (UPS) unit 70 that provides power to ONT 28 via power line 48 and transmits data to ONT 28 via power line 48. Again, power line 48 may include two wires, i.e., a power conductor and a ground, i.e., power return, conductor. A power bus 59 within ONT 28 receives the power from power line 48 for distribution to various electronic components within the ONT. UPS unit 70 includes a battery 66 for use in the event of power failure. Because battery performance and reliability are adversely affected by temperature extremes, UPS unit 70 may be mounted inside the subscriber's premises, separately from ONT 28. In some embodiments, however, UPS unit 70, battery 66, or both may be mounted in a common housing or enclosure with ONT 28.

In general, one-way and two-way communication of status, alarm, and/or configuration signals may be provided between ONT 28 and UPS unit 70 via power line 48. In this manner, power line 48 serves the dual role of delivering power from UPS unit 70 to ONT 28 and delivering status, alarm and/or configuration signals between UPS unit 70 and ONT 28. As will be described in detail, OLT 12 may provide remote monitoring and configuration of UPS unit 70 by exchanging data with ONT 28, which in turn exchanges data with UPS unit 70 via power line 48.

ONT 28 provides an interface between optical fiber link 11 on PON 10 and connected subscriber equipment (not shown) in a fiber-to-the-home (FTTP) network. In general, ONT 28 includes optical interface 56 for receiving information in the form of voice, video and data from PON 10 over optical fiber link 11 from OLT 12. ONT processing circuitry 50 processes received voice, video, and data information to deliver telephone, television, and Internet services, i.e., voice, video and data, to subscriber equipment (not shown). Subscriber equipment may include telephones, computers, televisions, set-top boxes, network appliances, and the like. In some embodiments, ONT processing circuitry 50 may include data circuitry, video circuitry, and telephone circuitry for processing incoming data for delivery of Internet, television, and telephone services, respectively. In addition, ONT processing circuitry 50 and optical interface 56 enable ONT 28 to transmit voice and data information upstream to OLT 12 over optical fiber link 11, e.g., using time division multiplexing techniques.

As further shown in FIG. 3, OLT 12 includes OLT processing circuitry 40 and optical interface 46 to receive voice and data information from ONT 28 and transmit voice, video, and data information downstream to ONT 28 via optical fiber link 11. In general, OLT processing circuitry 40 handles reception and transmission of information in the form of frames, packets, or other units of information over PON 10. In addition, OLT 12 includes configuration module 42 and monitoring module 44. As will be described in detail, monitoring module 44 supports remote monitoring of the status of battery 66 within UPS unit 70 and configuration module 42 allows OLT 12 to provide software maintenance for UPS unit 70 via ONT 28.

Each of OLT and ONT processing circuitry 40 and 50, respectively, may be implemented as one or more microprocessors, digital signal processors (DSPs), application specific integrated circuits (ASICs), field-programmable gate arrays (FPGAs), or other equivalent logic circuitry. In addition, each of optical interfaces 46 and 56 may comprise an optical receiver that converts optical signals received from optical fiber link 11 into electrical signals and an optical transmitter that receives electrical signals from OLT and ONT processing circuitry 40 and 50, respectively, and converts the electrical signals to optical signals for transmission over PON 10 via optical fiber link 11. Optical interfaces 46 and 56 may be formed by conventional opto-electrical conversion hardware.

ONT 28 is powered locally at the subscriber premises by power line 48, which extends between UPS unit 70 and ONT 28. Again, power line 48 may comprise a DC power conductor and a ground conductor, e.g., as shown in FIG. 2. UPS unit 70 includes AC/DC circuitry 74 to provide AC-to-DC voltage conversion from line power 72 (e.g., 110 volt, 60 Hz in North America) provided by the subscriber premises to produce DC power for transmission over power line 48. UPS unit 70 also includes battery 66 for backup power during a power failure to maintain critical services, such as voice service.

A power bus 69 within UPS unit 70 receives power from AC/DC circuitry 74 for distribution of power to various electronic components within the UPS unit. AC/DC circuitry 74 may further include battery charging circuitry that converts line power to DC electrical battery charging current to maintain an adequate charge level on battery 66. When line power 72 is unavailable, e.g., due to a line power failure, DC power provided by battery 66 is used to power ONT 28 via power line 48. However, the power delivered by battery 66 is limited depending on size and rate of power consumption. In addition, because battery 66 is a chemical system that degrades over time, battery 66 must replaced occasionally. Thus, it is important that ONT 28 knows when it is running on power provided by battery 66 and monitors the status of battery 66 to ensure reliable operation.

UPS unit 70 includes UPS processing circuitry 60 to perform monitoring functions for battery 66 on a continuous or periodic basis to ensure the health of battery 66 and reliability of the FTTP network. Battery monitoring requirements are well documented in industry standards such as, International Telecommunications Union (ITU)-T Recommendation J.173 and American National Standards Institute/Society of Cable Telecommunications Engineers (ANSI/SCTE) standard 24-14 2002. These standards generally specify four battery status or alarm signals: AC Fail, Battery Low, Replace Battery, and Battery Missing. Although other terminology may be used to refer to such signals, the same or similar information is generally conveyed. For example, AC Fail indicates that line power is unavailable or has failed. Battery Low indicates that battery charge level is below a minimum level. Replace Battery indicates that the battery is unable to provide the designed amount of battery backup. Battery Missing indicates whether the battery is present or has been removed from UPS unit 70. UPS processing circuitry 60 monitors battery 66 via monitoring circuitry and generates the appropriate status or alarm signal corresponding to the state of battery 66, either voluntarily or in response to a status request from ONT 28 or from OLT 12 via ONT 28.

Conventional UPS units transmit the four battery alarm signals as discrete signals on separate wires. As a result, such UPS units typically have at least six wires, i.e. a wire for power, a wire for ground (i.e., power return) and separate wires for each of the four battery alarm signals. In addition, a UPS unit may include a signal return wire to accommodate systems that optically isolate the signals, resulting in seven wires. However, adding additional wires to a power line that couples a UPS unit to an ONT increases the cost of the cable and the complexity and time associated with installation.

For example, it is difficult to pre-terminate the cable with a connector because every subscriber premises may require a different length of cable and connectors are difficult to pass through walls, particularly insulated outside walls. Consequently, at least one end of the cable generally must be unterminated so that the service provider can more easily pass the cable through walls. Termination of even one side of the cable presents deployment issues because cable is cheapest and most efficiently used when purchased on spools and cut to length. Thus, for the lowest cost, neither end should be pre-terminated with a connector. In this case, the installer is required to terminate the individual wires manually. However, manual termination is a slow and error-prone operation, particularly with six or seven separate wires.

Further, conventional UPS units ordinarily permit communication in only one direction, i.e. from the UPS unit to the ONT. However, it may be desirable for an ONT to communicate with a UPS unit. For example, UPS units may have internal software that occasionally requires maintenance, such as a software update. As a result, UPS units that only transmit data to an ONT require physical access to the UPS unit in the subscriber premises when providing software maintenance. Physical access to a UPS unit is generally expensive and inconvenient to obtain. In some cases, such UPS units may even be recalled from the field in order to upgrade software or fix a software defect.

Unlike UPS units that transmit the four battery alarm signals as discrete signals on separates wire to an ONT, UPS unit 70 transmits data to ONT 28 via a common power line 48. The data may comprise battery status or alarm signals as well as configuration signals In general, one-way or two-way communication of status, alarm, and configuration signals can be transmitted between ONT 28 and UPS unit 70 via power line 48. For example, UPS unit 70 may provide battery status monitoring by transmitting alarm signals to ONT 28 via power line 48. In another example, OLT 12 may remotely monitor the status of battery 66 by making status requests, such as requests for periodic numeric test results from UPS unit 70 via ONT 28. In a further example, OLT 12 may remotely configure UPS unit 70 by providing software maintenance and support for different configurations, such as the availability of audible alarms.

To support efficient two-way communication for remote monitoring and configuration, additional circuitry may be added to conventional UPS units and ONTs. In particular, ONT 28 may include physical interface 53 and UPS unit 70 may include physical interface 63. Physical interface 53 includes demodulator 52, modulator 54, and AC coupling circuitry 55 to support two-way communication. To transmit data to UPS unit 70, physical interface 53 inserts a carrier frequency onto the power conductor of power line 48. Specifically, modulator 54 converts the output data generated by ONT processing circuitry 50 into an AC signal that is AC coupled onto power line 48 by AC coupling circuitry 55. The output data generated by ONT processing circuitry 50 may include status requests or configuration commands. Physical interface 53 may insert the carrier whenever a logic "0" is received as an input from ONT processing circuitry. In some embodiments, physical interface 53 may insert a carrier frequency of greater than or equal to approximately 1 MHz in response to data generated by ONT processing circuitry 50.

Physical interface 53 may insert the carrier signal whenever directed by ONT processing circuitry 50. ONT processing circuitry 50 may output half duplex digital data that is used by modulator 54 to produce the carrier signal that is then inserted on the DC power line. Hence, modulator 54 produces the carrier signal and AC coupling circuitry 55 couples the carrier signal onto power line 48. ONT 28 also includes filter 58, which is located at one end of power line 48 and filters the carrier frequency out of the power supply terminals at ONT 28 when data is received from UPS unit 70. Demodulator 52 receives the output of filter 58 and demodulates the signal carrier. When there is a carrier on power line 48, demodulator 52 may output a logic "0." When there is not a carrier on power line 48, demodulator 52 outputs a logic "1." In some embodiments, demodulator 52 may take the form of a high pass filter with a comparator that compares the level of the filtered signal to a threshold to determine whether data is present on the power conductor of power line 48. ONT processing circuitry 50 processes the output of demodulator 52 to provide reliable monitoring of battery 66, as will be described in further detail.

Physical interface 63 of ONT 70 may include demodulator 62, modulator 64, and AC coupling circuitry 65. Physical interface 63 may operate in a manner similar to physical interface 53. Physical interface 63 inserts a carrier frequency onto power line 48 to transmit data generated by UPS processing circuitry 60 to ONT 28. The data may be status or alarm signals transmitted in response to a request from ONT 28, or status or alarm signals autonomously generated by UPS processing circuitry 60 of UPS unit 70. The data also may include acknowledgement signals generated in response to configuration commands from ONT 28. Modulator 64 converts the output of UPS processing circuitry 60 into a carrier signal that is AC coupled onto power line 48 by AC coupling circuitry 65. AC coupling circuitry 55 and AC coupling circuitry 65 may correspond to capacitors 35 and 33, respectively, of FIG. 2. The carrier can be modulated to transmit any customary status or alarm signals, e.g., AC Fail, Battery Low, Replace Battery, and Battery Missing, as well as other status, alarm or acknowledgement signals.

Modulator 64 may insert a carrier frequency of approximately 1 MHz onto power line 48 in some embodiments. Physical interface 63 may insert a carrier whenever a logic "0" is received as an input from UPS processing circuitry 60. UPS processing circuitry 60 may also output half duplex digital data. Modulator 64 modulates the half duplex digital data at the carrier frequency and AC coupling circuitry 65 couples the signal onto power line 48. UPS unit 70 also includes filter 68 to filter the carrier frequency out of the power supply terminals at UPS unit 70. In accordance with FIG. 3, filters 58 and 68 are located at opposing ends of power line 48. Demodulator 62 receives the output of filter 68 and demodulates the signal carrier. When there is modulation on power line 48, demodulator 62 outputs a logic "0." When there is not modulation on power line 48, demodulator 62 outputs a logic "1." UPS processing circuitry 60 processes the output of demodulator 62 to provide reliable monitoring of battery 66 and configuration of UPS unit 70. In this manner, ONT 28 and UPS unit 70 support one-way or two-way communication of data for reliable monitoring of battery 66 and configuration of UPS unit 70.

The rate of data transmitted between ONT 28 and UPS unit 70 may be slow, e.g., in the kilobits/second range. Consequently, any of several protocols may be used to transmit data between ONT 28 and UPS unit 70, such as RS232 or 1 Wire Interface. Physical interfaces 53 and 63 should work well with a variety of serial half duplex bus architectures because the Data In on one end of the bus, i.e., power line 48, is the same as Data Out on the other end of the bus.

In some embodiments, one of physical interfaces 53 and 63 may function as a master while the other functions as a slave. In this case, the slave only sends data when the master requests data. For example, physical interface 53 of ONT 28 may serve as the master and physical interface 63 of UPS unit 70 may serve as the slave. In alternative embodiments, physical interface 63 may transmit data upon receiving a request from physical interface 53 or in response to detecting a change in the status of battery 66. In any case, UPS unit 70 may transmit a status, alarm or acknowledgement signal in response to receiving a status request from ONT 28, and may also transmit a status or alarm signal autonomously when a change in the status of battery 66 is detected.

OLT 12 may provide remote monitoring of battery 66 by transmitting a status request to UPS unit 70 via ONT 28. In this case, monitoring module 44 may request periodic numeric test results from UPS unit 70 via ONT 28 to monitor the status of battery 66. Monitoring module 44 may request a load test on battery 66, a temperature measurement of UPS unit 70, or other tests that indicate the status of battery 66. UPS unit 70 may send a pass/fail result to OLT 12, via ONT 28, when performing a load test on battery 66. Load tests may enable service providers to determine degradation rates of batteries from different vendors while OLT 12 may determine if UPS unit 70 is deployed in an inappropriate location based on the temperature.

Monitoring module 44 provides battery status monitoring by transmitting a status request to UPS unit 70 via ONT 28. Monitoring module 44 may include circuitry to determine the status of battery 66 based on data received from UPS unit 70 via ONT 28. Alternatively, OLT processing circuitry 40 may include circuitry to determine the status of battery 66. In any case, OLT 12 monitors the status of battery 66 by selecting periodic intervals for transmitting a status request to UPS unit 70. In particular, monitoring module 44 may include circuitry, such as a counter and a comparator, to select the periodic intervals. When the output of the counter matches a threshold stored in the comparator, monitoring module 44 may transmit a status request to ONT 28 via optical fiber link 11 by outputting an electrical signal to optical interface 46. Optical interface 46 converts the electrical signal into an optical signal suitable for transmission via optical fiber link 11.

Optical interface 56 converts the optical signal received from optical interface 46 into an electrical signal. ONT 28 transmits a corresponding status request or configuration signal to UPS unit 70 via power line 48. In particular, ONT processing circuitry 50 processes the electrical signal to generate an input for modulator 54. Modulator 54 modulates the input to produce a carrier signal, e.g., at approximately 1 MHz. AC coupling circuitry 55 inserts the carrier signal onto power line 48, as previously described. In this manner, OLT 12 may transmit a status request or configuration command to UPS unit 70.

In order for UPS unit 70 to receive the status request, filter 68 first filters the carrier frequency out of the power supply terminals at UPS unit 70. As described previously, demodulator 62 demodulates the output of filter 68 to produce data corresponding to the status or configuration data generated by OLT 12 and received from ONT 28. UPS processing circuitry 60 processes the output of demodulator 62. Specifically, UPS processing circuitry 60 may determine the status of UPS unit 70 in accordance with the status request transmitted by OLT 12.

UPS processing circuitry 60 may output a signal corresponding to the specific status request received from ONT 28. For example, UPS processing circuitry 60 may determine the status of UPS unit 70 by performing a load test on battery 66 and outputting a pass/fail signal. In another example, UPS processing circuitry 60 may determine the status of UPS unit 70 by measuring the temperature of UPS unit 70 and outputting a status or alarm signal associated with the temperature of UPS unit 70. In each case, UPS processing circuitry 60 may further include or be associated with appropriate test or measurement circuitry. UPS processing circuitry 60 may also output the appropriate one of the four alarm signals according to the status of battery 66. Herein, the signal output by UPS processing circuitry 60 in response to receiving a status request or in response to a detected alarm condition may generally be referred to as a status signal or alarm signal. In any case, physical interface 63 inserts a carrier signal that corresponds to the status or alarm state of battery 66 on power line 48, as previously described, to transmit the status or alarm signal to ONT 28.

Next, ONT 28 receives the status signal and transmits the signal to OLT 12. Specifically, filter 58 filters the carrier frequency out of the power supply terminals at ONT 28. Demodulator 52 demodulates the output of filter 58 and ONT processing circuitry 50 processes the demodulated signal. ONT processing circuitry 50 may simply identify information directed to optical interface 56. Alternatively, modulator 54 may output the modulated signal directly to optical interface 56. In any case, optical interface 56 converts the electrical signal into an optical signal suitable for transmission to OLT 12 via optical fiber link 11.

Upon receiving the status or alarm signal, OLT 12 processes the signal to monitor the status of battery 66. Optical interface 46 converts the optical signal into an electrical signal. Monitoring module 44 may process the output of optical interface 56 to monitor the status of battery 66. For example, monitoring module 44 may process the signal to determine the degradation rate of battery 66. In another example, when the signal is based on the temperature of UPS unit 70, monitoring module 44 may determine if UPS unit 70 is mounted in an inappropriate location. In a further example, monitoring module 44 may provide an alert or indicator to the service provider if the signal corresponds to one of Battery Low, Replace Battery, or Battery Missing alarm signals. In yet another example, when OLT 12 receives the AC Fail signal, monitoring module 44 may cause OLT 12 to transmit information packets to ONT 28 less frequently in order to reduce the power consumption of ONT 28. Alternatively, OLT processing circuitry 40 may process the output of optical interface 46 to monitor the status of battery 66. In any case, OLT 12 may remotely monitor the status of battery 66 by transmitting a status request to UPS unit 70 via ONT 28 in accordance with an embodiment of the invention.

OLT 12 may also provide remote configuration of UPS unit 70 by transmitting a configuration signal or command to UPS unit 70 via ONT 28. In this case, configuration module 42 may provide software maintenance and support for different configurations. UPS unit 70 and, in particular, UPS processing circuitry 60, may include software that can be used to present a number of different configuration choices to the service provider. For example, a service provider may desire audible alarms with the hardware of UPS unit 70. In a conventional UPS unit, a hardware switch is configured at the time of installation to support audible alarms. However, UPS unit 70 may allow audible alarms to be provisioned from OLT 12. Again, OLT 12 may be located at a CO on PON 10.

Configuration module 42 may remotely configure UPS unit 70 via ONT 28 to support different configurations, such as the availability of audible alarms. Similarly, if a service provider does not want audible alarms, this feature can be turned off remotely without the need for a service call. Furthermore, UPS unit 70 may include internal software that occasionally requires maintenance, such as a software update. Configuration module 42 may provide remote software maintenance to UPS unit 70 via ONT 28, thereby eliminating the need for physical access to UPS unit 70. As a result, the invention may reduce the cost of providing software maintenance because physical access to a UPS unit is generally expensive and inconvenient to obtain.

Configuration module 42 may provide remote configuration for UPS unit 70 by transmitting a configuration signal to UPS unit 70 via ONT 28. Configuration module 42 may include circuitry for generating configuration signals or software maintenance signals. For example, configuration module 42 may generate signals that indicate memory provisioning within UPS unit 70 to specify the configuration of the UPS unit. Configuration module 42 may include memory for storing software updates that are transmitted to update software within UPS unit 70. Specifically, upon receiving and storing a new software update, configuration module 42 may transmit a configuration signal to UPS unit 70 via ONT 28 for updating UPS unit 70.

Again, UPS processing circuitry 60 may include software that requires maintenance by downloading a software update. In some embodiments, UPS unit 70 may periodically communicate with OLT 12 via ONT 28 to check for software updates or alert OLT 12 of a software problem with UPS unit 70. Additionally, UPS unit 70 may also transmit an acknowledgement signal to OLT 12 via ONT 28 after updating the appropriate software. In any case, configuration module 42 allows OLT 12 to remotely configure UPS unit 70 by transmitting a configuration signal to UPS unit 70. In general, OLT 12 and UPS unit 70 communicate via ONT 28. In particular, OLT 12 communicates with ONT 28 via optical fiber link 11 and ONT 28 communicates with UPS unit by transmitting data via insertion of a carrier signal on DC power line 48.

UPS unit 70 may provide remote monitoring of battery 66 by transmitting an alarm signal to OLT 12 via ONT 28. In this case, UPS unit 70 may monitor the status of battery 66. Specifically, UPS processing circuitry 60 may detect a change in the status of battery 66. For example, UPS processing circuitry 60 may monitor the status of battery 66 using conventional hardware and techniques. However, upon detecting a change in the status of battery 66, UPS unit 70 autonomously transmits a status or alarm signal to ONT 28 via power line 48, as previously described, rather than transmitting the alarm signals as discrete signals on separate wires to ONT 28. Again, the status or alarm signals may comprise AC Fail, Battery Low, Replace Battery, and Battery Missing, as well as other alarm signal that reflect the status of battery 66. In any case, UPS unit 70 transmits alarm signals to OLT 12 via ONT 28 to provide remote monitoring. In particular, UPS unit 70 transmits alarm signals to ONT 28 via power line 48 and ONT 28 transmits the alarm signals to OLT 12 via optical fiber link 11.

By supporting two-way communication between ONT 28 and UPS unit 70, OLT 12 can provide advance remote monitoring and configuration features for UPS unit 70. In particular, OLT 12 can transmit status requests and configuration signals while UPS unit 70 may still transmit conventional alarm signals, all via a common power line 48. In addition, transmitting data between UPS unit 70 and ONT 28 via power line 48 results in inexpensive two-way communication.

FIG. 4 illustrates example physical layer waveforms for transmitting a serialized data stream over power line 48. In the example of FIG. 4, waveform 80 represents the Data In signal at UPS unit 70 of FIG. 2. Waveform 80 transmits data at an optimum bit time, $t_{bit}$, or Baudrate, indicated by reference numeral 82. As an example, waveform 80 may have a maximum Baudrate of 9600 baud. With a 1 MHz clock at a 10k Baudrate, each dominant bit will have fifty cycles. Waveform 84 represents the Vups output of physical interface 63 in response to Data In. Waveform 86 represents the Vont signal received by physical interface 53 of ONT 28. Waveform 88 represents the Data Out output of physical interface 53 in response to the Vont signal. Notably, the ONT Data Out generally corresponds to the UPS Data In. Waveforms 84 and 86 represent physical layer communication between ONT 28 and UPS unit 70. Waveforms 80, 88 represent data link layer communication.

Although FIG. 4 depicts one-way communication from UPS unit 70 to ONT 28, two-way communication may be provided in a similar manner. Waveforms 80, 84, 86, and 88 may be used to transmit status requests, configuration signals, and conventional alarm signals between ONT 28 and UPS unit 70 via power line 48, as described herein. In some embodiments, the invention may utilize a particular protocol, such as RS232, and may also provide multiple error checking mechanisms to identify data transfer errors. Multiple error checking mechanisms may include, for example, a 16-bit packet cyclic redundancy check (CRC) error check and transmission unit rule base that indicates an error condition at the receiving unit. Example protocol and error checking mechanisms are described in further detail with respect to FIG. 6.

In FIG. 4, waveform 80 provides a serial logic input to physical interface 53 and includes a series of logic high and logic low signals. Waveform 80, as illustrated in FIG. 4, is merely illustrative and serves only to illustrate a waveform carrying a series of logic high and logic low signals. Modulator 64, within physical interface 63, receives waveform 80 as a Data In input and produces waveform 84 as a modulated carrier signal. In particular, modulator 54 may modulate an approximately 1 to 2 MHz carrier signal so that the carrier is present on power line 48 when waveform 80 is at logic low.

To receive status and alarm signals, filter 58 filters the carrier frequency out of the power supply terminals at ONT 28. Waveform 86 represents an example output waveform of filter 58. Demodulator 52, within physical interface 53, demodulates waveform 86 to produce waveform 88. Accordingly, waveform 88 corresponds to the status signal generated by UPS unit 70. Again, physical interface 63 may operate in a reciprocal manner to receive status request, configuration request, and the like from ONT 28, or from OLT 12 via ONT 28.

Figure 5:
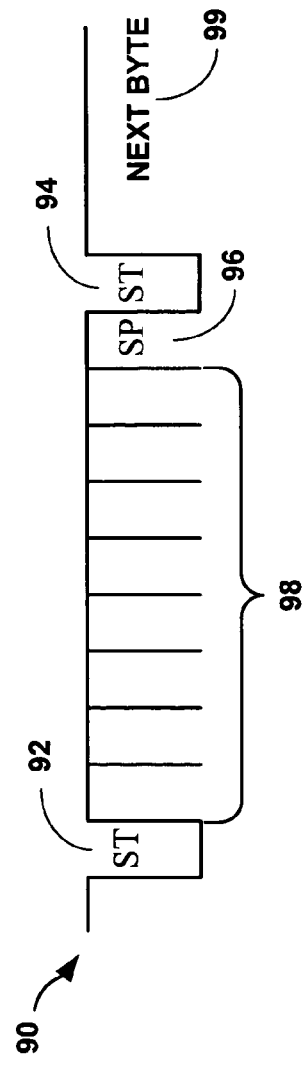
FIG. 5 illustrates an example data link layer waveform format for transmitting serialized data.

FIG. 5 illustrates an example protocol or waveform format for transmitting serialized data 90 provided at UPS Data In. In one exemplary embodiment, the data link layer of ONT 28 and UPS unit 70 may utilize a standard universal asynchronous receiver transmitter (UART) using a N-8-1 setting with a Baudrate of 9,600 to transmit data according to the protocol. In the illustrated example, data 90 carries one byte of serialized data 98 encapsulated with a dominant start bit (ST) 92 before and a recessive end or stop bit (SP) 96 after every eight data bits in the packet are transmitted.

Dominant start bit 92, data byte 98, and recessive end bit 96 form one message packet of the described waveform format. For illustrative purposes, data 90 also includes a "next byte" 99 preceded by a dominant start bit 94. Although not shown, "next byte" 99 ends with a recessive end bit and forms another message packet. Data 90 may also include idle bytes (not shown) before, after, or between message packets. In general, data 90 may include any combination of message packets and idle bytes. A dominant start bit may correspond to a logic low signal while a recessive end bit may correspond to a logic high signal. Idle bits may also correspond to recessive bits.

Figure 6:
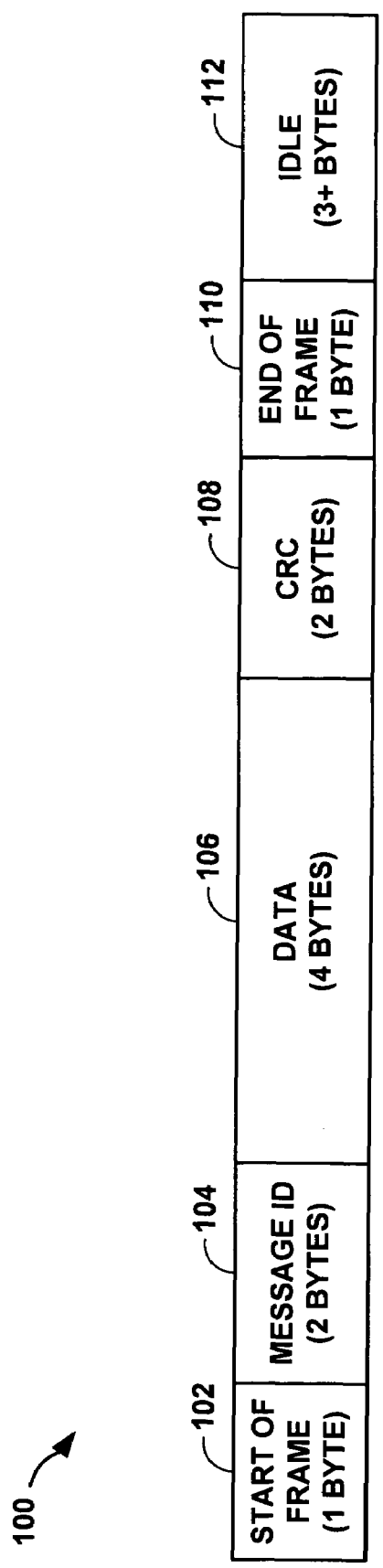
FIG. 6 illustrates an example message packet layer structure for transmitting data over the common power line.

FIG. 6 illustrates an example message packet layer structure for transmitting data over power line 48. In particular, message packet 100 represents one example message packet of a serialized data stream UPS Data In transmitted between UPS unit 70 and ONT 28 via power line 48. In the example of FIG 6, message packet 100 has a fixed length of ten bytes including the start of frame (SOF) and end of frame (EOF) bytes 102 and 110, respectively. Accordingly, a "frame" refers to the eight bytes between the SOF and EOF bytes 102 and 110, respectively. A frame includes a message identification (ID) field 104, a data field 106, and a CRC field 108. In this manner, a frame may be transmitted over power line 48 using the direction order of SOF to EOF. The transmission protocol requires the transmitter to send three idle bytes 112 with no start or end bit after the EOF field 110. Thus, individual fields are delivered from most significant bit (MSB) to least significant bit (LSB).

In this example, a new message packet may be started only after the UPS Data In bus has been idle for three or more bytes. In addition, a transmitter, i.e., ONT 28 or UPS unit 70, may be required to transmit at least one packet per second. The transmitter may transmit a NoDat (no data) or other buffer packet to fulfill this requirement. Because the following example utilizes a simplex design, there is no feedback from the receiver to determine successful transmission. Accordingly, no retransmission strategy is applied in the following description. However, the invention is not limited as such. For example, in some embodiments, the invention may provide a means to apply the protocol to two-way communication, e.g., half-duplex or full-duplex.

In general, message packet 100 may be transmitted between ONT 28 and UPS unit 70 by inserting a carrier signal over power line 48. The carrier signal is repeatedly inserted to encode the contents of message packet 100. For example, UPS unit 70 may transmit a status or alarm signal to ONT 28, ONT 28 may transmit a status request to UPS unit 70, or ONT 28 may transmit a configuration command to UPS unit 70. In any case, the receiving unit, i.e., processing circuitry associated with ONT 28 or UPS unit 70, examines each field of the received packets to determine what information is contained in the message packet.

The SOF field 102 includes one byte and denotes the start of a new message. SOF field 102 may include a value of 0x8F for clock skew detection reasons and denotes a new message if preceded by three idle bytes. Idle bytes may have a value of 0xFF. Message ID field 104 includes two bytes that identify the payload content in data field 106. In particular, message ID field 104 may include the ID of the protocol message being transmitted. In this case, each message class has an assigned unique ID that is defined in the protocol. The message classes are described in detail herein. As an example, data ID field 104 may be used to prioritize messages being sent simultaneously, such as in a half-duplex or full-duplex configuration. However, this function is not required for point-to-point simplex or one-way communications.

Data field 106 includes the payload of message packet 100 that defines the available messages transmitted between ONT 28 and UPS unit 70 via power line 48. Data field 106 has a constant length of four bytes. However, not all message packets utilize all four bytes. Accordingly, non-utilized bytes or bits should be filled with recessive bits for consistency.

CRC field 108 includes two bytes and may contain the result of a 16-bit CRC polynomial computation. A completely transmitted packet contains a 16-bit CRC to validate the data in data ID field 104 and data field 106. The receiving device rejects a message packet if the CRC test fails. In an exemplary embodiment, the polynomial used to generate the CRC is: X15+X14+X10+X8+X7+X4+X3+1. The remainder that occurs after the polynomial division is the CRC sequence transmitted over the network.

The transmission format or protocol may also provide other methods for detecting transmission errors, such as inter-byte timeout, inter-packet timeout, and no message received error timeout. A receiver determines an inter-byte timeout error has occurred when a start or end bit is expected, but is missing from the message packet because the transmitter is required to wrap each byte sent with a start bit before and an end bit after every eight data bits. When the receiver determines an error has occurred, the receiver may clear its receive buffer and waits for a new start byte.

The receiver determines that an inter-packet timeout error has occurred when an idle EOF sequence is not detected at the receiver because the transmitter sends three idle bytes with no start/end bit after the EOF byte 110. In this case, the receiver may clear its receive buffer and wait for the next start of frame.

The transmission protocol requires that at least one message packet is transmitted successfully per second. If the receiver does not receive a message in this time period, the receiver determines an no message received timeout error has occurred. The EOF field 110 includes one byte and, as previously described, coupled with idle bytes 112, denotes the end of a message.

The transmission protocol may require messages be transmitted per zero or more transmit classes given in Table 1 below.

TABLE 1

Transmit Classes

| Transmit Class | Associated Rules |
|---|---|
| ST | Start Up and 60 seconds after start up |
| DIAG | Upon diagnostic completion |
| CH | Upon change of data field |
| 60 S | Every 60 seconds |
| B60 S | Every 60 seconds when on battery |
| 60 M | Every 60 minutes |

TABLE 1-continued

Transmit Classes

| Transmit Class | Associated Rules |
| --- | --- |
| MANU | At manufacturer's discretion |
| PR | At protocol's discretion |

An ST message packet may be transmitted when either one of ONT 28 or UPS unit 70 starts up. UPS unit 70 may transmit a DIAG message packet upon completing an internal diagnostic. A CH message packet may be transmitted upon a change of data field 106. A 60S message packet may be transmitted every 60 seconds, for example, to ensure that ONT 28 and UPS unit 70 are operating properly. ONT 28 may transmit a B60S message packet every 60 seconds when ONT 28 is operating on backup battery power supplied by UPS unit 70. A 60M message packet may be transmitted every 60 minutes. A MANU message packet may comprise a manufacturer specific field that provides data, such as the status of UPS unit 70, to the central office (CO) on the network. A PR message packet may comprise a packet that serves to provide data necessary for the protocol implemented by ONT 28 and UPS unit 70, such as a filler or buffer packet to fulfill the requirement that at least one message packet be transmitted per second.

Message packets may be sent per the rules described in the Transmit Class column in Table 2 provided below. Message packets with higher Message ID values have transmission priority. Thus, upon receiving a message packet, the receiving unit interrogates message ID field 104 to determine the priority of the message packet. Detailed encoding for each message class is described herein.

TABLE 2

Message Packets

| Message Name | Transmit Class | Message ID | Message Category |
| --- | --- | --- | --- |
| Battery Status | ST, CH, 60 S | 0x 15 | General |
| Current Supply Voltage | MANU | 0x 25 | General |
| UPS Internal Diagnostic | DIAG | 0x 35 | General |
| Power Source Type ID | ST, 60 M | 0x 45 | General |
| Backup Time Remaining | B60 S | 0x 55 | General |
| UPS Manufacturer ID Number | ST, 60 M | 0x 65 | General |
| Firmware Revision | ST, 60 M | 0x 75 | General |
| UPS Serial Number | ST, 60 M | 0x 85 | Manufacturer Specific Message |
| UPS Model Number | ST, 60 M | 0x 95 | Manufacturer Specific Message |
| NoDat (No Data) | PR | 0x F5 | Manufacturer Specific Message |
| Baud/Clock Check | ST, 60 S | 0x F6 | General |
| Temperature | ST, 60 S | 0x F7 | General |

A battery status message provides the availability and status of UPS status signals. For example, byte 0 may provide information about the status of the battery backup. In this case, bits 7-4 may be reserved and set to 0, while bit 3 provides an "On Battery" status signal, bit 2 provides a "Low Battery" status signal, bit 1 provides a "Battery Missing" status signal, and bit 0 provides a "Battery Replace" status signal. The On Battery status signal indicates whether the UPS is currently providing battery backup to the ONT. The Low Battery status signal indicates whether the UPS battery has reached its "low" state. When the UPS battery has reached its low state, the UPS battery is no longer sufficiently charged to power the necessary circuitry of the ONT. The Battery Missing status signal indicates whether the UPS battery is present or has been removed. The Battery Replace status signal indicates whether the UPS battery is able to provide the designed amount of battery backup to the ONT.

Byte 1 may provide information about the availability of the status signals. For example, bits 7-4 may be reserved and set to 0 while bit 3 provides an "On Battery Available" status signal, bit 2 provides a "Low Battery Available" status signal, bit 1 provides a "Battery Missing Available" status signal, and bit 0 provides a "Battery Replace Available" status signal. Each of these status signals indicates whether the status signal is currently available. The remaining bytes of data field 106 for a battery status message are unused and may be filled with recessive bytes.

A current supply voltage message packet provides the current supply voltage of the UPS battery for diagnostic purposes. For example, the current supply voltage may be indicated in units of 1/100 of a Volt. Special codes, such as FFFF or FFFE, may be supplied in bytes 0, 1 to indicate the current supply voltage is not provided or the UPS unit 70 cannot currently provide this information for some reason, respectively.

A UPS internal diagnostic status message packet indicates the result of an internal diagnostic by the UPS unit 70. For example, byte 0 of data field 106 indicates a pass/fail score, such as pass, fail, not run, or not available, and byte 0 may indicate a failure code, such as not available, or not provided on this product, provided by the UPS. The failure code may be specific to the manufacturer of the UPS unit 70.

A power source type ID message packet describes the type of UPS connected to the ONT. Byte 0 of the message packet may specify the power source type, such as unknown, none, internal or UPS sub-system of ONT, meter caller, shared, or other power source types.

A backup power time remaining message provides the approximate battery life remaining on the UPS battery until the UPS battery cannot sufficiently power the ONT 28. For example, byte 0 may specify the hour component for the remaining UPS battery backup time and byte 0 may specify the minute component for the remaining UPS battery backup time. Accordingly, byte 0 may have a range of 0-24 and byte 1 may have a range of 0-59. Special codes, such as FF or FE, may be used to indicate unknown, unavailable, or not applicable.

A UPS manufacturing ID number message packet provides the UPS manufacturing identifier. For example, byte 0 may represent specific type IDs and use special codes FF and 00 to indicate unknown type IDs or no type IDs.

A firmware revision message packet provides the revision of UPS firmware. For example, a four one-byte field format may be provided in which byte 0 indicates the major release number, byte 1 indicates the minor release number, byte 2 indicates the patch release number, and byte 3 indicates the build number. Fields that are not required may be filled with a value of zero.

A UPS serial number message packet indicates an original equipment manufacturer (OEM) serial number associated with the UPS. Because a manufacturer serial number may not be able to be fully represented in data field 106, i.e., exceeds four bytes, a manufacturer may provide a sub-set of the product serial number and a special serial number that can be represented in four bytes. For example, a model number can be 1-32 digits right field adjusted. High order unused bits may be filled with 0 values. A model number of 0 may imply that no model number is provided.

A UPS model number message provides the OEM model number of the UPS. The UPS model number may be represented in a similar manner as the UPS serial number.

A NoDat message comprises a message packet with no data content in data field 106 and may be used to fulfill transmit requirements, i.e., transmitting at least one message packet per second.

A Baudrate/Clock Check message includes a pattern in data field 106 that allows the receiver to detect that either the transmitter's oscillator or the receiver's oscillator is shifting. Oscillators in the transmitter and receiver may shift due to changing temperature. Thus, a known data pattern allows the receiver to adjust its baudrate setting to match the transmitters baudrate setting. In particular, a pattern with repeating values for each byte, such as repeating the value 8A in each of bytes 0-3, may be used.

A temperature message indicates the temperature at a UPS location. For example, bytes 0, 1 may specify the temperature of the UPS in a range of −128° F. to 127.9° F. Special codes, such as FFFF or FFFE, may also be used to indicate that the temperature feature is not provided for this UPS or that the UPS cannot currently provide this information for some reason.

Any bytes in data field 106 of a message packet for the previously described messages that are unused may be filled with recessive bits or bytes.

Figure 7:
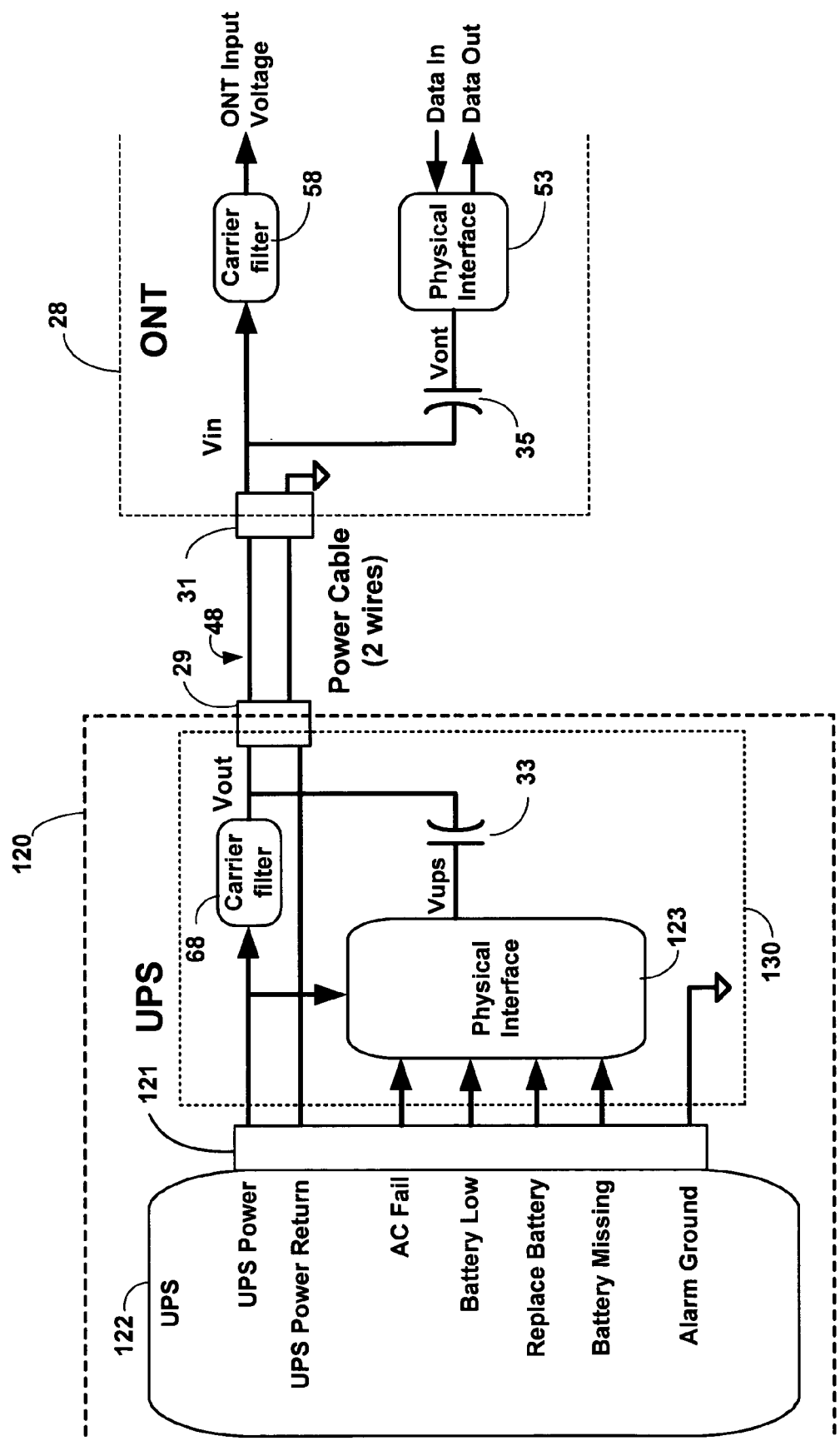
FIG. 7 is a block diagram illustrating an alternative UPS unit that provides power and data to an ONT via a common power line.

FIG. 7 is a block diagram illustrating an alternative UPS unit 120 that provides power and data to ONT 28 via common power line 48. Specifically, UPS unit 120 provides an adapter unit that converts a conventional UPS unit to interface with ONT 28 as described herein. A conventional UPS unit ordinarily provides separate alarm signal terminals that transmit four battery alarm signals as discrete signals on separate wires to an ONT. A UPS unit can be modified, as described herein, to generate data based on the alarm signals for transmission over a common power line. Alternatively, in accordance with the example of FIG. 7, an adapter unit may be provided to couple to the separate alarm terminals of a UPS unit, and generate data, based on the signals at the terminals, for transmission over a power line.

In the example of FIG. 7, UPS unit 120 enables the four battery status or alarm signals to be transmitted to ONT 28 via common power line 48. UPS unit 120 does not alter the signal output terminals used to output alarm or status signals, such as AC Fail, Battery Low, Replace Battery, and Battery Missing. Instead, adapter unit 130 couples to the alarm signal terminals, providing an adapter between a six-terminal UPS unit (e.g., AC Fail, Battery Low, Replace Battery, Battery Missing, UPS Power, UPS Power Return) or seven-terminal UPS unit (e.g., AC Fail, Battery Low, Replace Battery, Battery Missing, UPS Power, UPS Power Return, and Alarm Ground) and a two-conductor power line. In this manner, UPS unit 120 provides a cost effective solution to convert an standard UPS unit to transmit power and battery alarm signals to ONT 28 via a common power line 48. As a result, UPS unit 120 decreases cost as well as installation complexity by eliminating the use of a separate wire for each alarm signal.

FIG. 7 represents the physical layer communication between ONT 28 and UPS unit 120. As shown in FIG. 2, UPS unit 120 includes a UPS unit 122 with a seven pin terminal block header 121 and an adapter unit 130 with a physical interface 123, an AC coupling capacitor 33, and a carrier filter 68. Physical interface 123, AC coupling capacitor 33, and carrier filter 68 may generally form an adapter unit 130 electrically connected to UPS unit 122 via terminal block header 121. Adapter unit 130 is coupled to the signal terminals of UPS unit 122 and converts the seven-wire interface of conventional UPS unit 122 to a two wire interface as described herein.

As shown in FIG. 7, seven pin terminal block header 121 may have a pin terminal for DC output power (UPS Power), ground (UPS Power Return), and each of the battery alarm/status signals, i.e., AC Fail, Battery Low, Replace Battery, and Battery Missing. A signal return pin terminal (Alarm Ground) may be included for systems that optically isolate the battery alarm signals, providing seven pins. Adapter 130 may comprise a common circuit board carrying physical interface 123, AC coupling capacitor 33, and carrier filter 68. Adapter 130 may be powered by the DC output power and ground terminals of UPS unit 122, along with suitable power conversion or regulation circuitry, if necessary.

Adapter 130 may include pin connectors that interface with terminal block header 121 to electrically connect adapter 130 to conventional UPS unit 122. In this manner, a service technician may convert a conventional UPS unit to interface with ONT 28 by simply installing adapter 130. In some cases, input terminals associated with adapter unit 130 may simply be plugged into the terminal block associated with UPS 122. For example, adapter unit 130 may include a circuit board, input terminals and output terminals assembled in a common housing, e.g., made from plastic. Output terminals associated with adapter unit 130 may be coupled to the power conductor and ground conductor of power cable 48. Various types of connectors may be used to electrically connect adapter 130 to conventional UPS unit 122.

ONT 28 functions substantially as described with respect to FIGS. 2 and 3 and, thus, includes the same components, i.e., AC coupling capacitor 35, physical interface 53, and carrier filter 58. Power line 48 also functions as described with respect to FIGS. 2 and 3 and includes a power and a ground wire coupled to terminals 29 and 31 of UPS unit 120 and ONT 28, respectively.

In operation, conventional UPS unit 122 delivers power to ONT 28 via power line 48 and transmits alarm/status signals to physical interface 123 via corresponding pin terminals of pin terminal block header 121. UPS unit 122 may monitor the status of the power source or battery using conventional hardware and techniques. In particular, conventional UPS unit 122 autonomously transmits an alarm signal to physical interface 123 via the corresponding terminal in response to detecting a change in the status of the battery.

Physical interface 123 receives the signal and transmits data to ONT 28 as previously described. More specifically, physical interface 123 may comprise a microcontroller or other processing circuitry that converts the alarm/status signals to data for transmission over power cable 48. The circuitry in physical interface 123 selectively modulates the input received on the alarm signal terminals. Physical interface 123 modulates a carrier signal, e.g., approximately 1 to 2 MHz, so that the carrier indicates data representative of the alarm/status signal on power line 48.

As previously described, in order to minimize EMI, modulation may not normally be generated by physical interface 123 when UPS unit 122 does not transmit a battery alarm signal. Since adapter unit 130 converts a the output of UPS unit 122 to interface with ONT 28, physical interface 123 may generate physical layer waveforms in accordance with the waveforms shown in FIG. 4. In particular, the modulated signal, Vups, produced by physical interface 123 may be AC coupled to the Vout line of UPS unit 120 via capacitor 33 so that physical interface 123 does not receive the DC Vout voltage. Carrier filter 68 serves to keep the output impedance of UPS unit 120 from loading down Vups. The receiver portion of physical interface 53 detects this modulation on power line 48 and converts it to logic low at the Data Out of ONT 28 as previously described.

Figure 8:
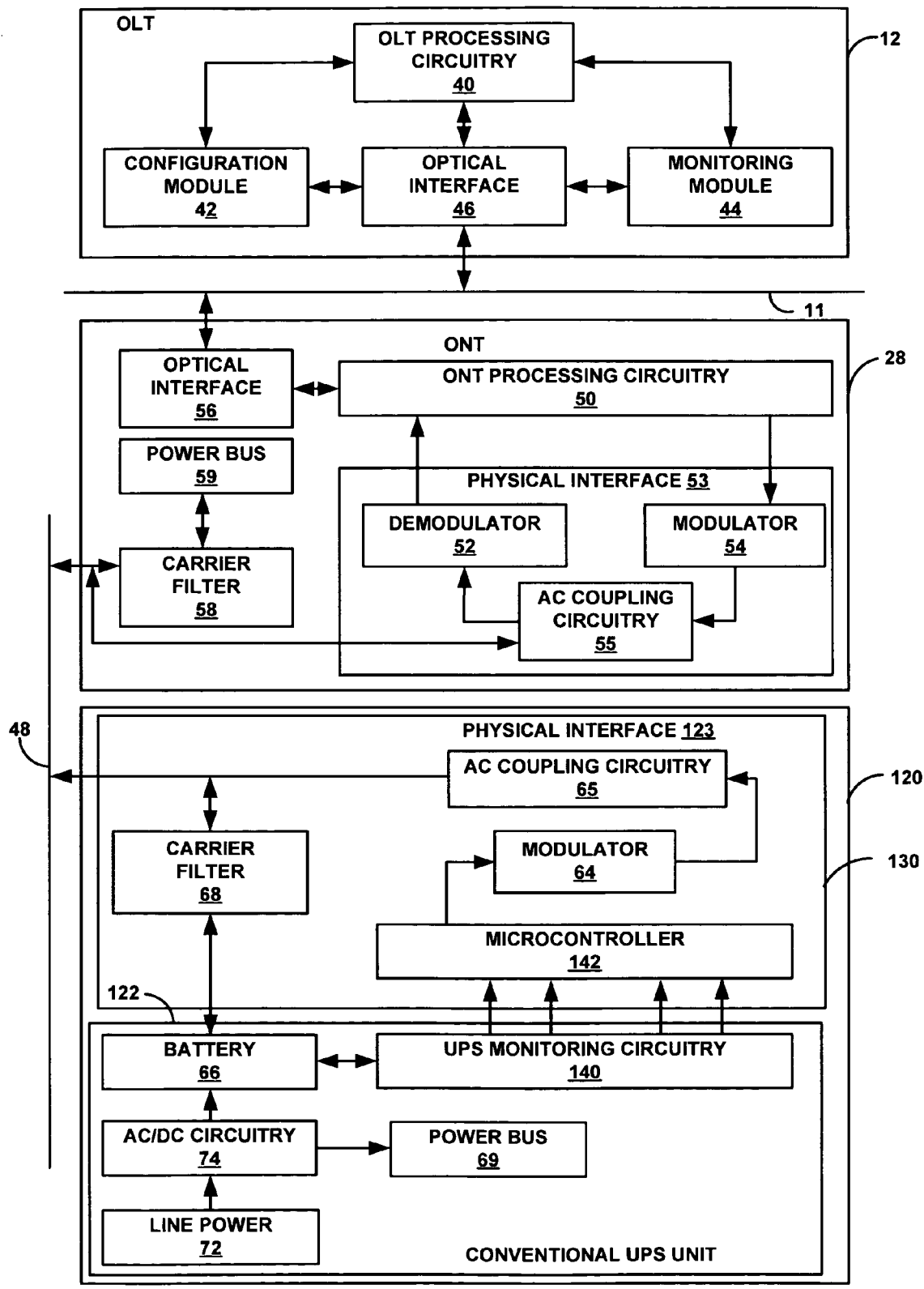
FIG. 8 is a block diagram illustration incorporation of the alternative UPS unit that provides power and data to the ONT via a common power line in the PON of FIG. 1.

FIG. 8 is a block diagram illustrating an alternative UPS unit 120 that delivers power to ONT 28 via power line 48 and transmits battery alarm signals to ONT 28 via power line 48. FIG. 8 is substantially similar to FIG. 3, but illustrates use of an adapter unit 130 as shown in FIG. 7. In general, adapter unit 130 converts the interface of the UPS unit 120 to permit transmission of data via power line 48 to ONT 28. Accordingly, UPS unit 120 only transmits battery status or alarm signals to ONT 28 via power line 48 in accordance with the techniques described herein. In this manner, UPS unit 120 provides remote monitoring of battery 66 by transmitting an alarm signal to OTL 12 via ONT 28.

As previously described with respect to FIG. 3, OLT 12 includes OLT processing circuitry 40 and optical interface 46 to receive voice and data information from ONT 28 and transmit voice, video, and data information downstream to ONT 28 via optical fiber link 11. In some embodiments, UPS unit 120 may not be configured to receive status requests, configuration signals or software maintenance from OLT 12. Consequently, OLT 12 may be manufactured with or without configuration module 42.

ONT 28 provides an interface between optical fiber link 11 on PON 10 and connected subscriber equipment (not shown) in a FTTP network as previously described with respect to FIG. 3. Furthermore, power line 48 may include two wires, i.e., a power conductor and a ground conductor. A power bus 69 within ONT 28 receives the power from power line 48 for distribution to various electronic components within the ONT.

Adapter unit 130 carries circuitry for transmitting battery alarm signals to ONT 28 via power line 48. UPS unit 122 includes a battery 66 for use in the event of a power failure to maintain critical services, such as voice service. UPS unit 122 also includes AC/DC circuitry 74 to provide AC-to-DC voltage conversion from line power 72 (e.g., 110 volt, 60 Hz in North America) provided by the subscriber premises, a power bus 69 that receives power from AC/DC circuitry 74 for distribution of power to various electronic components within conventional UPS unit 122, and UPS monitoring circuitry 140 that monitors the status of battery 66 using conventional hardware and techniques.

UPS monitoring circuitry 60 may perform monitoring functions for battery 66 on a continuous or periodic basis to ensure the health of battery 66 and reliability of the FTTP network as previously described. UPS monitoring circuitry 140 may monitor battery 66 using conventional techniques and, upon detecting a change in the status of battery 66, generates the appropriate alarm signal corresponding to the state of battery 66. However, rather than transmit the four battery alarm signals as discrete signals on separate wires, the alarm signals are transmitted as discrete signals on separate terminals of a standard UPS seven pin terminal block header. The signals are received by physical interface 123 of adapter unit 130, which converts the signals to data and transmits data to ONT 28 via power line 48 in accordance with previously described techniques.

As shown in FIG. 8, physical interface 123 may include microcontroller 142, modulator 64, and AC coupling circuitry 65. To transmit data to ONT 28, physical interface 123 inserts a carrier frequency onto the power conductor of power line 48. More specifically, modulator 64 converts the output data generated by microcontroller 142 into an AC signal that is AC coupled onto power line 48 by AC coupling circuitry 65. Modulator 64 can modulate the carrier to transmit any of the alarm signals. Carrier filter 68 serves to keep the output impedance of UPS unit 120 from loading down the modulated signal. Because UPS unit 122 transmits the battery signals as discrete signals on separate alarm signal terminals, microcontroller 142 is provided to convert the signals to data based on the signals received on each alarm signal terminal. In some cases, only one of the terminals may transmit a signal at a given time. Consequently, physical interface 123 may insert a carrier whenever microcontroller outputs a logic "0." In response to logic "0," modulator 54 produces the carrier signal that is then inserted on power line 48.

ONT 28 receives the alarm signal and transmits the signal to OLT 12. IN particular, UPS unit 120 transmits alarm signals to ONT 28 via power line 48 and ONT 28 transmits the alarm signals to OLT 12 via optical fiber link 11. Upon receiving the status or alarm signal, OLT 12 processes the alarm signal thereby providing remote monitoring of battery 66.

Figure 9:
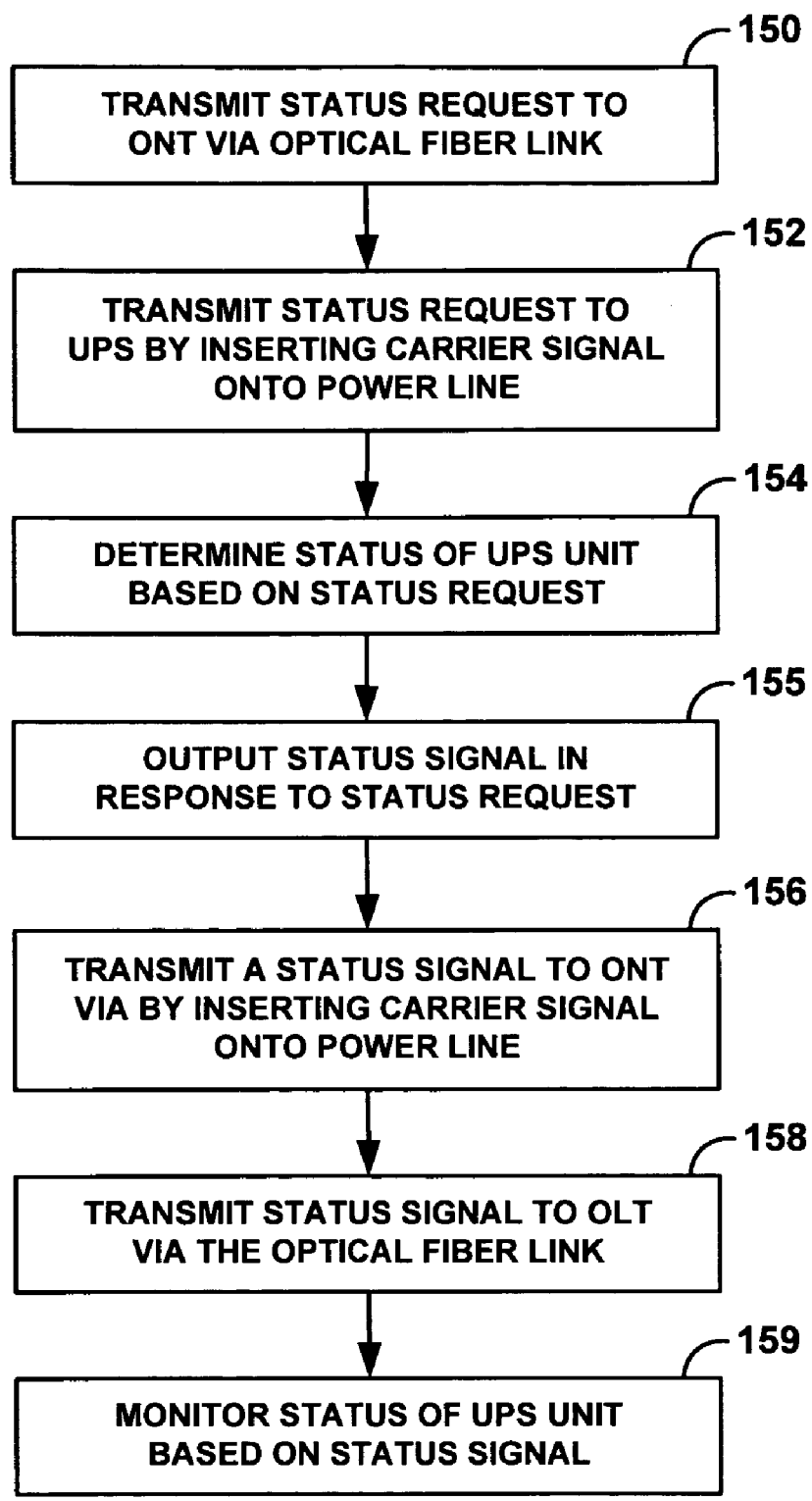
FIG. 9 is a flow diagram illustrating a remote monitoring technique in accordance with an embodiment of the invention.

FIG. 9 is a flow diagram illustrating a remote monitoring technique in accordance with an embodiment of the invention. The technique will be described with reference to the exemplary structure illustrated in FIG. 3. Initially, OLT 12 transmits a status request to ONT 28 via optical fiber link 11 (150). In some embodiments, monitoring module 44 of OLT 12 may select periodic intervals at which to transmit the status request. Monitoring module 44 may request a load test on battery 66, a temperature measurement of UPS unit 70, or other tests that indicate the status UPS unit 70. ONT 28 transmits the status request to UPS unit 70 via power line 48 by inserting a carrier signal with a selected carrier frequency on power line 48 (152) and modulating the signal to convey data. Optical interface 56 converts the status request received from OLT 12 into an electrical signal. Modulator 54 generates a carrier signal that AC coupling circuitry 55 AC couples onto DC power line 48.

Upon receiving the status request, UPS unit 70 determines the status of UPS unit 70 based on the status request (154). However, in order for UPS unit 70 to receive the status request, filter 68 first filters the carrier frequency out of the power supply terminals at UPS unit 70 and demodulator 62 demodulates the output of filter 68. Then, UPS processing circuitry 60 may determine the status of UPS unit 70 and output a status signal based on the status request (155). Next, UPS unit 70 transmits the status signal to ONT 28 via power line 48 by inserting a carrier frequency signal on power line 48 (156). In particular, modulator 64 outputs the status signal as a signal that AC coupling circuitry 65 AC couples onto power line 48. ONT 28 receives the signal by filtering out the carrier frequency signal at the power terminals of ONT 28.

Demodulator 52 receives the filtered signal. ONT processing circuitry 60 directs the output of demodulator 52 to optical interface 56. ONT 28 transmits the status signal to OLT 12 via optical fiber link 11 (158). Specifically, optical interface 56 converts the electrical signal into an optical signal suitable for transmission over optical fiber link 11. In order for OLT 12 to receive the signal, optical interface 46 converts the optical signal into an electrical signal that is output to monitoring module 44. Monitoring module 44 may then monitor the status of UPS unit 70 based on the status signal (159). For example, monitoring module 44 may prompt or alert the service provider according to the received status signal. Alternatively, monitoring module may determine the degradation rate of battery 66 based on battery status signals or determine if UPS unit 70 is deployed in an inappropriate location based on a temperature signal.

Figure 10:
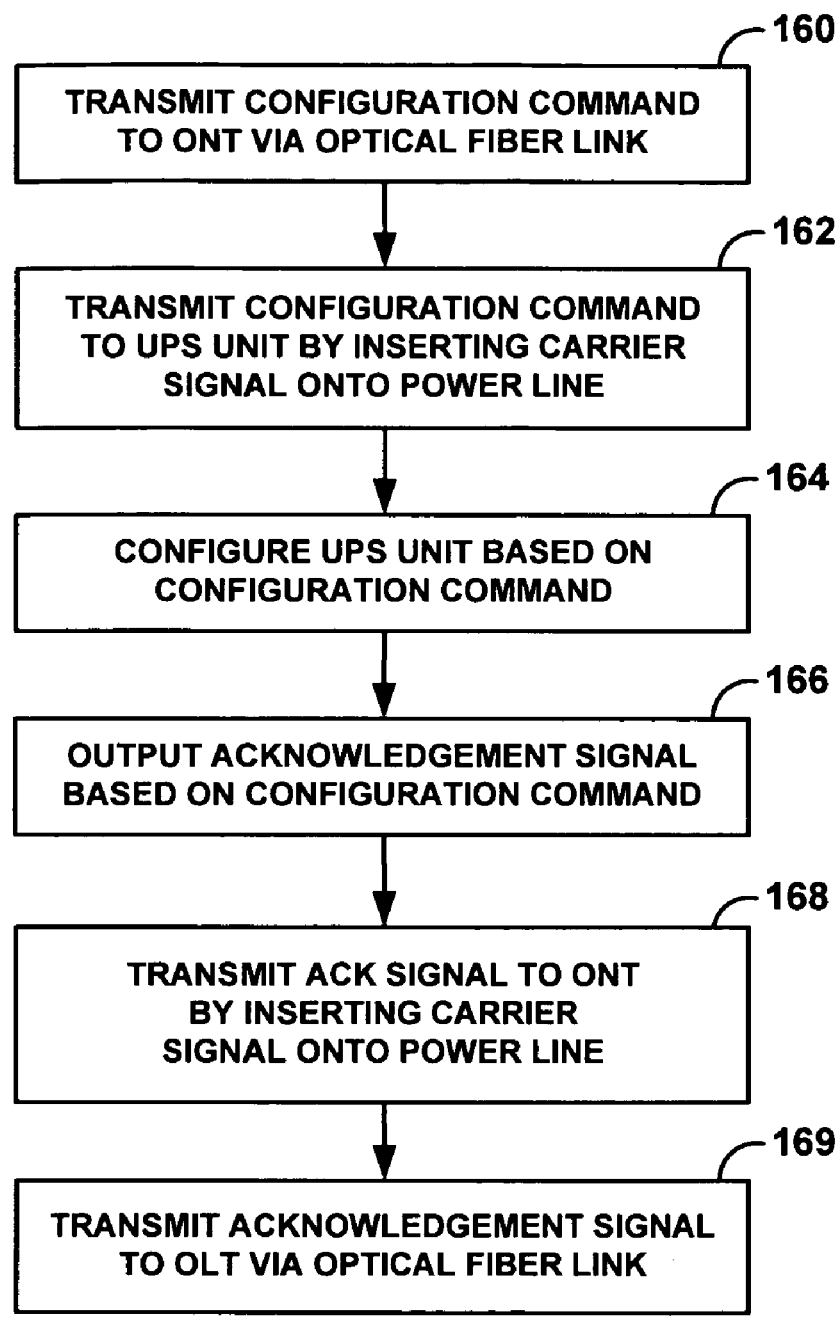
FIG. 10 is a flow diagram illustrating a remote configuration technique in accordance with an embodiment of the invention.

FIG. 10 is a flow diagram illustrating a remote configuration technique in accordance with an embodiment of the invention. First, OLT 12 transmits a configuration command to ONT 28 via optical fiber link 11 (160). OLT 12 may transmit the configuration command in response to a new software update being uploaded, for example, into memory included in configuration module 42. OLT 12 may also transmit the configuration command when the service provider desires to change the configuration of UPS unit 70. Additionally, OLT 12 may transmit a configuration command in response to receiving a signal from UPS unit 70. For example, UPS unit 70 may periodically communicate with OLT 12 to ensure stability of the FTTP network and check for available software updates.

In another example, UPS unit 70 may communicate with OLT 12 when there is a failure with the UPS software. In any case, configuration module 42 outputs the configuration signal as an electrical signal that optical interface 46 converts into an optical signal suitable for transmission over optical fiber link 11. Optical interface 56 converts the optical signal into an electrical signal and ONT 28 transmits a corresponding configuration command to UPS unit 70 by inserting a carrier signal onto power line 48 (162). In general, a configuration signal, or series of configuration signals, are used to change the configuration of UPS unit 70 or download a software update to the UPS unit.

As previously described, physical interface 63 receives the output of filter 68 in order to receive the configuration command. After the configuration command is received by UPS unit 70, UPS processing circuitry 60 configures UPS unit 70 based on the configuration command (164). Specifically, UPS processing circuitry 60 receives the output of physical interface 63 and provides software maintenance and/or support for different configurations. As an example, the configuration command may direct UPS processing circuitry to enable or disable audible alarms.

Upon configuring UPS unit 70, UPS unit 70 may optionally output an acknowledgement signal based on the configuration command (166) to confirm that the desired configuration has been completed. Again, UPS unit 70 transmits the acknowledgement signal to ONT 28 via power 48 by inserting a carrier frequency on power line 48 (168). Finally, ONT 28 transmits the acknowledgement signal to OLT 12 via optical fiber link (169). The acknowledgement signal from UPS unit 70 to OLT 12 may be transmitted in a manner similar to the status signal described with reference to FIG. 4.

Figure 11:
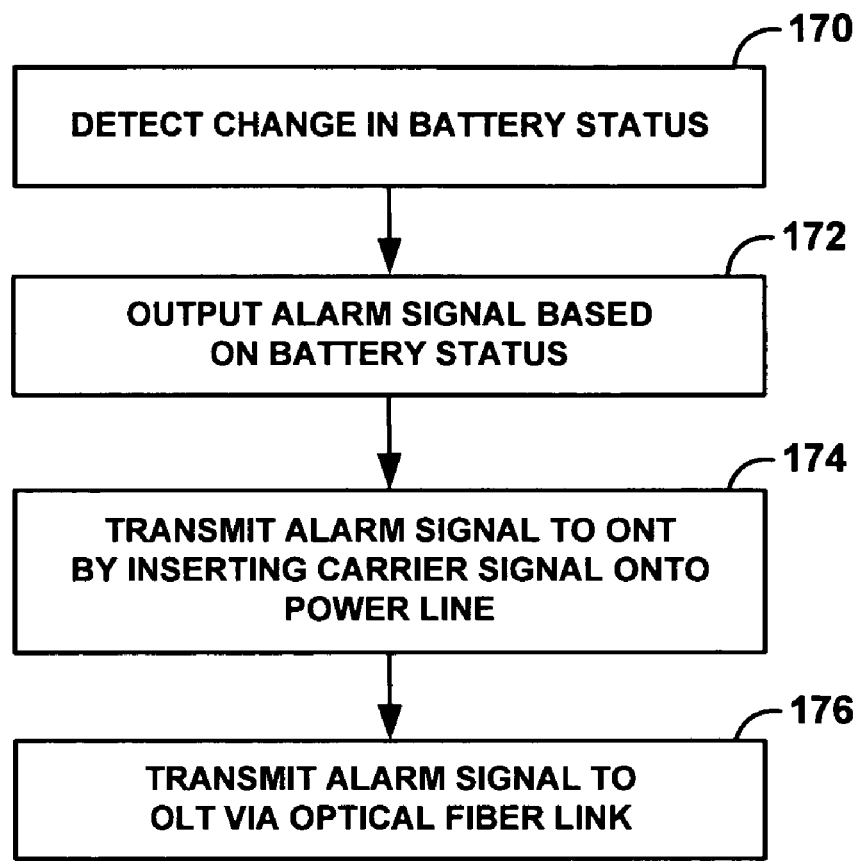
FIG. 11 is a flow diagram illustrating a battery alarm technique in accordance with an embodiment of the invention.

FIG. 11 is a flow diagram illustrating a battery alarm technique in accordance with an embodiment of the invention. In addition to responding to status request, UPS unit 70 may be configured to periodically monitor battery status on an autonomous basis, i.e., without a status request. In general, UPS unit 70 transmits an alarm signal to OLT 12 via ONT 28 upon detecting a change in the status of battery 66. In particular, UPS unit 70 may transmit one of the standard alarm signals, e.g. AC Fail, Battery Low, Replace Battery, and Battery Missing, in accordance with the status of battery 66. In accordance with the invention, each alarm signal can be sent along a common signal line such as power line 48.

Initially, UPS unit 70 detects a change in the status of battery 66 (170). For example, UPS processing circuitry 60 may include hardware for detecting a power failure by measuring the current of line power 72. UPS processing circuitry 60 may also include hardware for measuring the amount of power remaining in battery 66 or if battery 66 is not connected. In any case, UPS unit 70 outputs a status or alarm signal based on the status of battery 66 (172) when UPS unit 70 detects a change in the status of battery 66. UPS unit 70 may then autonomously transmit the alarm signal to ONT 28 via power line 48 by inserting a carrier signal onto power line 48 (174). Because UPS unit 70 may transmit any of the standard alarm signals over power line 48, the cost of cable that extends between UPS unit 70 and ONT 28 may be reduced and installation may be simplified. ONT 28 transmits the alarm signal to OLT 12 via optical fiber link 11 (176) after receiving the alarm signal from UPS unit 70.

Various embodiments of the invention have been described. However, one skilled in the art will appreciate that various embodiments or additions may be made to the described embodiments without departing from the scope of the claimed invention. For example, while the invention is generally described in the context of providing battery backup power, future UPS units may use other power sources, such as fuel cells. Fuel cells may require different alarm requirements than lead-acid batteries. As an example, fuel cells may not have a load test requirement, but may have a fuel gauge function that indicates the status of the fuel cell, such as when replacement is necessary. In accordance with the described invention, future UPS units that include fuel cells as a power source may be readily integrated into an FTTP system. In particular, the invention may provide remote monitoring and configuration for such UPS units while reducing the cost of installation and simplifying installation.

In addition, while the invention is generally described in the context of FTTP, UPS units are also used by other telecommunications equipment, including network interface devices such as cable modems or digital subscriber line (DSL) boxes. Various types of telecommunication equipment may require a UPS unit to provide AC-to-DC voltage conversion and/or a battery backup. In accordance with the invention, one-way or two-way communication of status, alarm, and configuration signals can be achieved using a common power line between a UPS unit and a network interface in general. In this manner, the invention may provide remote status monitoring and/or configuration for UPS units powering network telecommunication equipment while reducing the cost of installation and simplifying installation. Therefore, the invention may be applicable to use of a UPS unit with an ONT in a PON, as illustrated herein, or more generally to other types of network interface devices in other types of networks, including copper networks. These and other embodiments are within the scope of the following claims.

The invention claimed is:

1. A method comprising:
supplying power to a network interface device via a power line that extends between the network interface device and an uninterruptible power supply (UPS) unit; and
transmitting data to the network interface device from the UPS unit via the power line,
wherein transmitting data to the network interface device from the UPS unit via the power line includes generating serialized digital data comprising data indicating at least one of a status or an alarm of the UPS unit.

2. The method of claim 1, wherein the network interface device includes an optical network terminal (ONT) in a passive optical network (PON).

3. The method of claim 1, further comprising transmitting data from the network interface device to the UPS unit via the power line.

4. The method of claim 3, wherein the data transmitted to the UPS unit includes one or more status requests that request status of hardware associated with the UPS unit.

5. The method of claim 4, wherein the data transmitted to the network interface device includes data indicating the status of the UPS unit.

6. The method of claim 1, wherein the data transmitted to the network interface device indicates the status of the UPS unit.

7. The method of claim 1, wherein the data transmitted to the network interface device includes data indicating the alarm of hardware associated with the UPS unit.

8. The method of claim 7, wherein the data indicating the alarm includes data indicating at least one of an AC Fail signal indicating unavailability of line power to the UPS unit, a Battery Low signal indicating a low charge level on a battery associated with the UPS unit, a Replace Battery signal indicating a low power capability of the battery associated with the UPS unit, and a Battery Missing signal indicating absence of the battery associated with the UPS unit.

9. The method of claim 1, wherein transmitting the data comprises inserting a carrier signal onto the power line.

10. The method of claim 9, wherein the carrier signal has a carrier frequency of greater than or equal to approximately 1 megahertz (MHz).

11. The method of claim 9, further comprising filtering the carrier signal from the power line to receive the transmitted data in the network interface device.

12. The method of claim 1, wherein the network interface device includes an optical network terminal (ONT) on a passive optical network (PON), the method further comprising transmitting the received data from the ONT to an optical line terminal (OLT) on the PON via an optical fiber link.

13. The method of claim 1, further comprising transmitting data from the network interface device to the UPS unit via the power line, wherein the data transmitted to the UPS unit includes one or more status requests that request status of hardware associated with the UPS unit, and monitoring status of the hardware in response to the status requests.

14. The method of claim 13, wherein the network interface device includes an optical network terminal (ONT) on a passive optical network (PON), and wherein the data transmitted to the ONT includes data indicating the status of the hardware associated with the UPS unit, the method further comprising transmitting the data indicating the status to an optical line terminal (OLT) on the PON via an optical fiber link.

15. The method of claim 1, further comprising transmitting data from the network interface device to the UPS unit via the power line, wherein the data transmitted to the UPS unit includes one or more configuration commands that specify configuration of hardware associated with the UPS unit, and configuring the hardware in response to the configuration commands.

16. The method of claim 15, wherein the network interface device includes an optical network terminal (ONT) on a passive optical network (PON), the method further comprising receiving the configuration commands from an optical line terminal (OLT) on the PON via an optical fiber link.

17. The method of claim 15, wherein the configuration commands include software updates, the method further comprising updating software in the UPS unit in response to the configuration commands.

18. The method of claim 1, wherein the UPS unit includes a plurality of alarm signal terminals, and transmitting data to the network interface device from the UPS unit via the power line includes generating the data based on signals at the alarm signal terminals.

19. The method of claim 18, wherein generating the data includes generating the data via an adapter unit that couples to the alarm signal terminals.

20. The method of claim 1, wherein the power line includes a power conductor and a power return conductor, and the power line transmits direct current (DC) power.

21. The method of claim 1, wherein the data includes a digital message packet that comprises digital values selected to represent at least one of the status or alarm.

22. The method of claim 1, wherein the digital values indicate at least one of a UPS battery supply voltage value, a UPS power source type identification, a remaining backup power time value, a UPS manufacturer identification, a UPS serial number, a UPS model number, a baudrate/clock check message, and a temperature value.

23. The method of claim 1, further comprising transmitting the serialized digital data in accordance with a RS232 protocol.

24. An uninterruptible power supply (UPS) unit for a network interface device, the UPS unit comprising a power source, a power line that delivers power from the power source to the network interface device, and an interface that transmits serialized digital data comprising data indicating at least one of a status or an alarm of the UPS unit to the network interface device via the power line.

25. The UPS unit of claim 24, wherein the network interface device is an optical network terminal (ONT) in a passive optical network (PON).

26. The UPS unit of claim 24, wherein the interface receives data from the network interface device via the power line.

27. The UPS unit of claim 26, wherein the data received from the network interface device includes one or more status requests that request status of hardware associated with the UPS unit.

28. The UPS unit of claim 27, wherein the data transmitted to the network interface device includes data indicating the status of the hardware associated with the UPS unit.

29. The UPS unit of claim 24, wherein the data transmitted to the network interface device indicates the status of the UPS unit.

30. The UPS unit of claim 24, wherein the data received by the network interface device includes data indicating the alarm of the UPS unit.

31. The UPS unit of claim 30, wherein the data indicating the alarm includes data indicating at least one of an AC Fail signal indicating unavailability of line power to the UPS unit, a Battery Low signal indicating a low charge level on a battery associated with the UPS unit, a Replace Battery signal indicating a low power capability of the battery associated with the UPS unit, and a Battery Missing signal indicating absence of the battery associated with the UPS unit.

32. The UPS unit of claim 24, wherein the interface receives configuration commands from the network interface device, the configuration commands specifying configuration of hardware associated with the UPS unit.

33. The UPS unit of claim 32, wherein the configuration commands include software updates to update software in the UPS unit.

34. The UPS unit of claim 24, wherein the interface transmits the data to the network interface device via the power line by inserting a carrier signal onto the power line.

35. The UPS unit of claim 34, wherein the carrier signal has a carrier frequency of greater than or equal to approximately 1 megahertz (MHz).

36. The UPS unit of claim 24, further comprising a plurality of alarm signal terminals, and an adapter unit, associated with the interface, that couples to the alarm signal terminals, generates the data based on signals at the alarm signal terminals, and transmits the data via the power line.

37. The UPS unit of claim 24, wherein the power line includes a power conductor and a power return conductor, and the power line transmits direct current (DC) power.

38. The UPS unit of claim 24, wherein the data includes a digital message packet that comprises digital values selected to represent at least one of the status or alarm.

39. The UPS unit of claim 24, wherein the digital values indicate at least one of a UPS battery supply voltage value, a UPS power source type identification, a remaining backup power time value, a UPS manufacturer identification, a UPS serial number, a UPS model number, a baudrate/clock check message, and a temperature value.

40. The UPS unit of claim 24, wherein the UPS unit transmits the serialized digital data in accordance with a RS232 protocol.

41. A network comprising:
a network interface device;
an uninterruptible power supply (UPS) unit; and
a power line that delivers power from the UPS unit to the network interface device,
wherein the UPS unit transmits serialized digital data comprising data indicating at least one of a status or an alarm of the UPS unit to the network interface device via the power line.

42. The network of claim 41, wherein the network is a passive optical network (PON) and the network interface device is an optical network terminal (ONT) on the PON.

43. The network of claim 41, wherein the data transmitted to the network interface device indicates the status.

44. The network of claim 41, wherein the status data indicates at least one of an AC Fail signal indicating unavailability of line power to the UPS unit, a Battery Low signal indicating a low charge level on a battery associated with the UPS unit, a Replace Battery signal indicating a low power capability of the battery associated with the UPS unit, and a Battery Missing signal indicating absence of the battery associated with the UPS unit.

45. The network of claim 41, wherein the network interface device transmits data to the UPS unit via the power line, and wherein the data transmitted to the UPS unit includes configuration data.

46. The network of claim 41, wherein the UPS unit transmits the data to the network interface device via the power line by inserting a carrier signal onto the power line.

47. The network of claim 46, wherein the carrier signal has a carrier frequency of greater than or equal to approximately 1 megahertz (MHz).

48. The network of claim 41, wherein the UPS unit includes a plurality of alarm signal terminals, and generates the data based on signals at the alarm signal terminals.

49. The network of claim 41, wherein the power line includes a power conductor and a power return conductor, and the power line transmits direct current (DC) power.

50. The network of claim 41, wherein the UPS unit receives data from the network interface device via the power line.

51. The network of claim 50, wherein the data received from the network interface device includes one or more status requests that request status of hardware associated with the UPS unit.

52. The UPS unit of claim 51, wherein the data transmitted to the network interface device includes one or more signals indicating status of the hardware associated with the UPS unit.

53. The UPS unit of claim 41, wherein the data transmitted to the network interface device indicates the status of the UPS unit.

54. The UPS unit of claim 41, wherein the data indicates an alarm of the UPS unit.

55. The UPS unit of claim 54, wherein the alarm indicates at least one of an AC Fail signal indicating unavailability of line power to the UPS unit, a Battery Low signal indicating a low charge level on a battery associated with the UPS unit, a Replace Battery signal indicating a low power capability of the battery associated with the UPS unit, and a Battery Missing signal indicating absence of the battery associated with the UPS unit.

56. The UPS unit of claim 41, wherein the UPS unit receives configuration commands from the network interface device, the configuration commands specifying configuration of hardware associated with the UPS unit.

57. The UPS unit of claim 56, wherein the configuration commands include software updates to update software in the UPS unit.

58. The network of claim 41, wherein the data includes a digital message packet that comprises digital values selected to represent at least one of the status or alarm.

59. The network of claim 41, wherein the digital values indicate at least one of a UPS battery supply voltage value, a UPS power source type identification, a remaining backup power time value, a UPS manufacturer identification, a UPS serial number, a UPS model number, a baudrate/clock check message, and a temperature value.

60. The network of claim 41, wherein the UPS unit transmits the serialized digital data in accordance with a RS232 protocol.

61. An uninterruptible power supply (UPS) unit comprising:
a power source coupled to a power terminal;
a plurality of signal terminals; and
an adapter unit that couples to the signal terminals, generates serialized digital data based on signals at the signal terminals, and transmits the data via a power line coupled to the power terminal with power provided by the power source.

62. An adapter unit for an uninterruptible power supply (UPS) unit, wherein the UPS unit includes a power terminal and a plurality of signal terminals, the adapter unit comprising:
input terminals that couple to the power terminal and the signal terminals;
circuitry that generates serialized digital data based on signals at the signal terminals; and
output terminals that couple to a power line via the power terminal to transmit the data via the power line with power provided by the power terminal.

* * * * *

UNITED STATES PATENT AND TRADEMARK OFFICE
CERTIFICATE OF CORRECTION

PATENT NO. : 7,652,390 B2  Page 1 of 1
APPLICATION NO. : 11/313222
DATED : January 26, 2010
INVENTOR(S) : Vrla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this

Twenty-eighth Day of December, 2010

David J. Kappos
*Director of the United States Patent and Trademark Office*